(12) United States Patent
Glaser et al.

(10) Patent No.: US 11,810,067 B2
(45) Date of Patent: Nov. 7, 2023

(54) DIGITALLY MANAGED SHELF SPACE MARKETPLACE

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 0 days.

(21) Appl. No.: 17/139,827

(22) Filed: Dec. 31, 2020

(65) Prior Publication Data

US 2021/0201263 A1 Jul. 1, 2021

Related U.S. Application Data

(60) Provisional application No. 62/956,069, filed on Dec. 31, 2019.

(51) Int. Cl.
*G06Q 10/08* (2023.01)
*G06Q 10/0875* (2023.01)
*G06Q 30/0601* (2023.01)

(52) U.S. Cl.
CPC ..... *G06Q 10/0875* (2013.01); *G06Q 30/0641* (2013.01)

(58) Field of Classification Search
CPC combination set(s) only.
See application file for complete search history.

(56) References Cited

U.S. PATENT DOCUMENTS

| | | | |
|---|---|---|---|
| 6,744,938 B1 | 6/2004 | Rantze et al. | |
| 7,195,157 B2 | 3/2007 | Swartz et al. | |
| 8,452,868 B2 | 5/2013 | Shafer et al. | |
| 9,600,840 B1 | 3/2017 | Pope et al. | |
| 10,360,571 B2 | 7/2019 | Garel et al. | |
| 10,438,277 B1 | 10/2019 | Jiang et al. | |

(Continued)

OTHER PUBLICATIONS

Krishna, Aradhna, Luca Cian, and Nilufer Z. Aydinoglu. "Sensory Aspects of Package Design." Journal of Retailing 93.1 (2017): 43-54. (Year: 2017).

(Continued)

*Primary Examiner* — Peter Ludwig
*Assistant Examiner* — Reva R Moore
(74) *Attorney, Agent, or Firm* — Alpine Patents LLC; Brian Van Osdol

(57) ABSTRACT

A system and method for sensor-enabled automated inventory stocking management that can include: operating a computer vision monitoring system comprising collecting image data, and identifying, by processing the image data, products and shelf space locations of the products; maintaining a shelving property map based on the products and shelf space locations identified through the computer vision monitoring system; in association with at least one request, allocating a shelf space usage option within a shelf space management database system, wherein each shelf space usage option specifies fulfillment parameters including at least one product identity and a set of shelf space placement parameters; confirming, based on processing of updated image data from the computer vision monitoring system, fulfillment of conditions defined through the fulfillment parameters of the a shelf space usage option and, in response, performing reactionary actions in the computing system.

21 Claims, 11 Drawing Sheets

(56) References Cited

U.S. PATENT DOCUMENTS

| | | | |
|---|---|---|---|
| 10,963,893 B1 | 3/2021 | Sharma | |
| 11,176,590 B2 | 11/2021 | Dechu et al. | |
| 2008/0021766 A1 | 1/2008 | McElwaine et al. | |
| 2008/0043013 A1 | 2/2008 | Gruttadauria et al. | |
| 2008/0208719 A1* | 8/2008 | Sharma | G06Q 10/0875 700/32 |
| 2008/0249858 A1 | 10/2008 | Angell et al. | |
| 2011/0072132 A1 | 3/2011 | Shafer et al. | |
| 2012/0029691 A1 | 2/2012 | Mockus et al. | |
| 2013/0073388 A1 | 3/2013 | Heath | |
| 2013/0073473 A1 | 3/2013 | Heath | |
| 2013/0110652 A1 | 5/2013 | Herring et al. | |
| 2013/0110666 A1 | 5/2013 | Aubrey | |
| 2014/0365334 A1 | 12/2014 | Hurewitz | |
| 2015/0112838 A1 | 4/2015 | Li et al. | |
| 2015/0127490 A1 | 5/2015 | Puertas | |
| 2015/0262236 A1 | 9/2015 | Cypher et al. | |
| 2015/0324725 A1* | 11/2015 | Roesbery | G06Q 30/0639 705/7.39 |
| 2015/0363832 A1 | 12/2015 | Bleckmann | |
| 2016/0134930 A1 | 5/2016 | Swafford | |
| 2016/0379225 A1 | 12/2016 | Rider et al. | |
| 2017/0228804 A1 | 8/2017 | Soni et al. | |
| 2017/0300999 A1 | 10/2017 | Wilkinson et al. | |
| 2017/0364925 A1 | 12/2017 | Wilkinson et al. | |
| 2018/0350144 A1 | 12/2018 | Rathod | |
| 2019/0205933 A1 | 7/2019 | Glaser et al. | |
| 2019/0282000 A1 | 9/2019 | Swafford | |
| 2020/0065748 A1* | 2/2020 | Durkee | G06Q 30/0641 |
| 2021/0065217 A1 | 3/2021 | Glaser | |

OTHER PUBLICATIONS

Rettie, Ruth, and Carol Brewer. "The Verbal and visual components of package design." Journal of product and brand management 9.1 (2000): 56-70. (Year:2000).

Rowley, Jennifer. "Understanding digital content marketing." Journal of marketing management 24.5-6 (2008): 517-540. (Year: 2008).

Spence, Charles, and Alberto Gallace. "Multisensory design: Reaching out to touch the consumer." Psychology and Marketing 28.3 (2011): 267-308. (Year: 2011).

* cited by examiner

Collecting sensor data from at least one environment and generating a shelving property map S10

Operating a shelf space management portal interface S20

Directing operations of shelf space stocking based on the shelf space usage options S30

FIGURE 3

```
┌─────────────────────────────────────────────────┐
│ Operating a monitoring system with a distributed network of │
│ sensor-devices within at least one environment and collecting │
│              sensor data S110                    │
└─────────────────────────────────────────────────┘

┌─────────────────────────────────────────────────┐
│ Maintaining a shelving property map based in part on the sensor │
│                    data S120                     │
└─────────────────────────────────────────────────┘

┌─────────────────────────────────────────────────────┐
│     Operating the shelf space management portal interface S130  │
│                                                     │
│   ┌─────────────────────────────────────────────┐   │
│   │ Receiving, through a shelf space management portal │
│   │ interface, a plurality of shelf space usage requests S132 │
│   └─────────────────────────────────────────────┘   │
│                                                     │
│   ┌─────────────────────────────────────────────┐   │
│   │ Allocating a shelf space usage option within a shelf space │
│   │     management database system S134         │   │
│   └─────────────────────────────────────────────┘   │
└─────────────────────────────────────────────────────┘

┌─────────────────────────────────────────────────────┐
│ Directing operations of shelf space stocking based on the shelf │
│               space usage options S140              │
│                                                     │
│   ┌─────────────────────────────────────────────┐   │
│   │ Communicating stocking directives for a selected shelf space │
│   │              usage option S142              │   │
│   └─────────────────────────────────────────────┘   │
└─────────────────────────────────────────────────────┘

┌─────────────────────────────────────────────────┐
│ Cerifying fulfillment of the selected shelf space usage option │
│            through the sensor data S150          │
└─────────────────────────────────────────────────┘
```

FIGURE 4

```
┌─────────────────────────────────────────────────────────────────┐
│ Receiving, through a shelf space management portal interface,   │
│ a plurality of shelf space usage requests S232                  │
└─────────────────────────────────────────────────────────────────┘

┌─────────────────────────────────────────────────────────────────┐
│ Allocating a shelf space usage option within a shelf space      │
│ management database system S234                                 │
└─────────────────────────────────────────────────────────────────┘

┌─────────────────────────────────────────────────────────────────┐
│ Operating a computer vision monitoring system with a            │
│ distributed set of imaging devices directed at shelf space      │
│ regions in at least one environment S210                        │
│  ┌───────────────────────────────────────────────────────────┐  │
│  │ Collecting image data, and identifying, by processing the │  │
│  │ image data, products and shelf space locations of the     │  │
│  │ products S212                                             │  │
│  └───────────────────────────────────────────────────────────┘  │
└─────────────────────────────────────────────────────────────────┘

┌─────────────────────────────────────────────────────────────────┐
│ Maintaining a shelving property map based on the products and   │
│ shelf space locations identified through the computer vision    │
│ monitoring system S220                                          │
└─────────────────────────────────────────────────────────────────┘

┌─────────────────────────────────────────────────────────────────┐
│ Confirming, based on processing of updated image data from the  │
│ computer vision monitoring system, fulfillment of conditions    │
│ defined through the fulfillment parameters of the first shelf   │
│ space usage option S252                                         │
└─────────────────────────────────────────────────────────────────┘

┌─────────────────────────────────────────────────────────────────┐
│ Updating the shelf space management database S154               │
└─────────────────────────────────────────────────────────────────┘
```

DIGITALLY MANAGED SHELF SPACE MARKETPLACE

CROSS-REFERENCE TO RELATED APPLICATIONS

This application claims the benefit of U.S. Provisional Application No. 62/956,069, filed on 31 Dec. 2019, which is incorporated in its entirety by this reference.

TECHNICAL FIELD

This invention relates generally to the field of digital store management, and more specifically to a new and useful system and method for a digitally managed shelf space marketplace.

BACKGROUND

There are numerous changes occurring in the commerce space. E-commerce continues to grow, and meanwhile, physical retail stores are increasingly looking to technology to help with operations and providing features that would attract customers. One advantage physical retail stores have over e-commerce is the ability to physically display products so customers can see and interact with the products sold in the store. Despite the high value of a retail store's physical displays to the customers, retail stores have few ways to benefit from such use as a "showroom" other than from the sales made in the store. Thus, there is a need in the digital store operations field to create a new and useful system and method for a digitally managed shelf space marketplace. This invention provides such a new and useful system and method.

BRIEF DESCRIPTION OF THE FIGURES

FIG. 3 is a flowchart representation of a method;

FIGS. 4-6 are flowchart representations of method variations;

DESCRIPTION OF THE EMBODIMENTS

Figure 1:
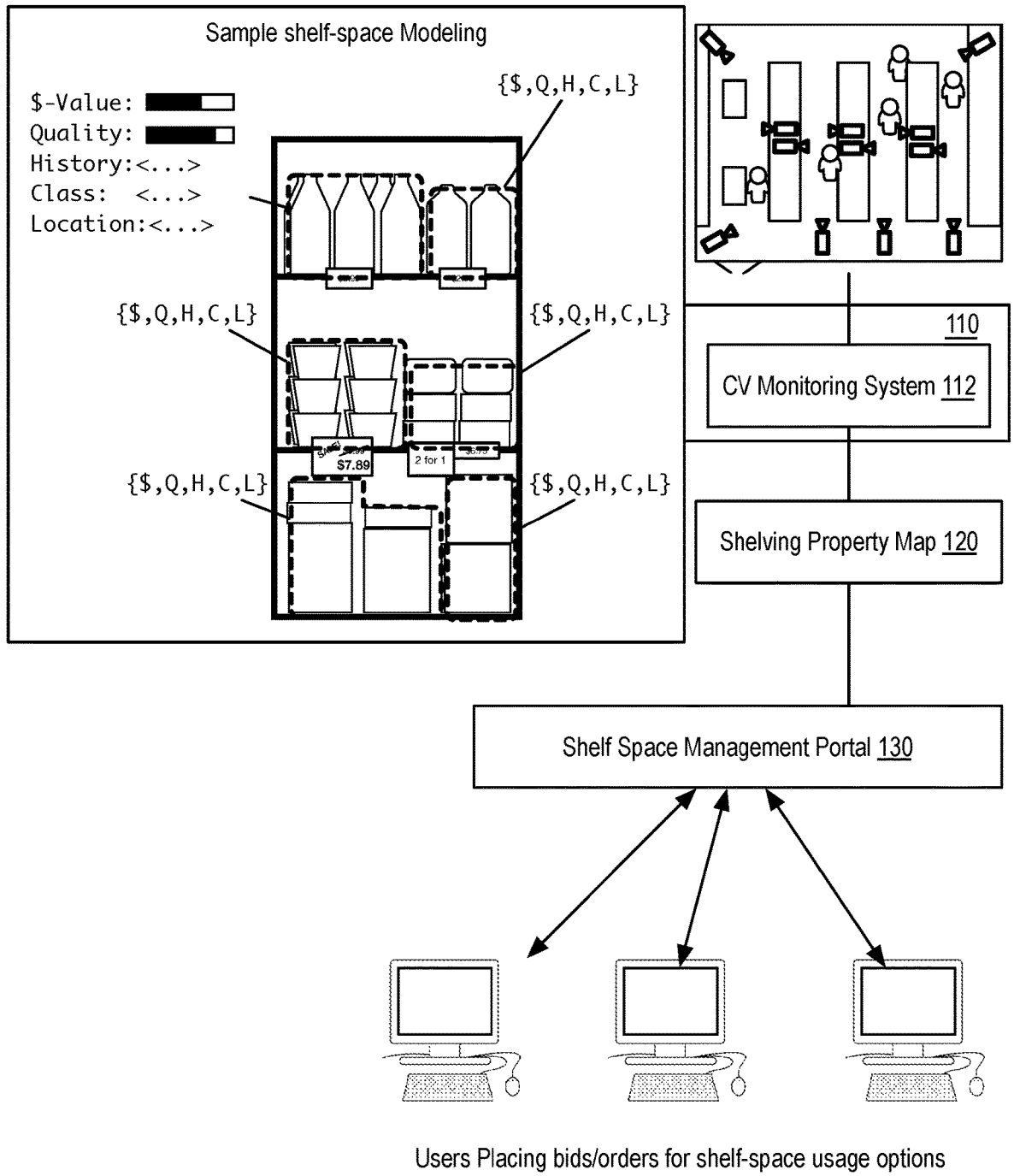
FIG. 1 is a schematic representation of a system.

The following description of the embodiments of the invention is not intended to limit the invention to these embodiments but rather to enable a person skilled in the art to make and use this invention.

1. Overview

A system and method for a digitally managed shelf space marketplace functions to employ automated monitoring technology for enabling physical retail environments to expose partial control over shelf space usage to interested outside parties. By using the system and method, the system and method can enable a retailer to monetize the valuable shelf space of their stores.

The system and method preferably leverage automated sensing and analysis of shelf space status in coordination with a database system managing requests for shelf space usage. The system and method provide unique operational efficiencies for determining how to fulfill product placement requests based on sensed state of the stocked inventory as well as automated auditing and monitoring when products are placed.

The system and method may be implemented in a variety of ways. Preferably, the system and method are able to create a shelving property map that can be used to define the options on which shelf space may be acquired. Various parties can then use a mechanism to book or schedule the use the shelf space. In one preferred implementation, an online marketplace can be setup where various promoters of products can pay to rent shelf space for various products. In one implementation, an automated auction system operated by the marketplace that selects winning bids for shelf space based on various factors such as someone's bid, product quality and relevance, product performance history, and/or other factors. Additionally, the system and method can address implementing the operational side of things by providing shelving instructions and and/or automated verification and reporting processes.

Furthermore, the system and method can enable a store operator management interface through which, operators of a store and/or a set of stores can customize and configure the operating parameters of the system and method. For example, various rules can be set in the possible product placement within a store, the pricing, metrics used in setting shelf space value, metrics used in selecting/prioritizing winning bids as a limited set of example.

Herein, the system and method are primarily described in reference to stocking and placement on shelf space displays. References to shelf space may additionally or alternatively include floor space, space in bins, space in refrigerators, wall-space, racks, and/or any region where a physical product or other suitable types of objects and/or other displays may be positioned. Reference to shelf space, as can be appreciated by one skilled in the art, does not limit the system and method to only use with shelving-based displays or shelving stocked environments. Similarly, references to a shelf or shelves and other related placement terminology such as aisle is not intended to limit the system and method to only those forms of display structures and/or regions. The system and method are primarily described in how it is used for stocking physical products in a given environment.

The system and method may similarly be used for other applications such as bidding on display space on various surfaces. For example, the system and method may additionally be used for marketplace for managing physical signs hung from a wall. In another example, the system and method may be used for a marketplace for product displays for various showroom-styled displays such as in a shop having different outfits displayed on mannequins.

The system and method preferably make use of a computer vision monitoring system that monitors and tracks inventory items and/or user-item interactions. The system and method may additionally or alternatively be used with other inventory monitoring systems such as smart shelves, product tagging/tracking systems, Radio Frequency Identification (RFID) based tracking system, and the like.

The system and method are preferably used in a retail environment. A grocery store is used an exemplary retail environment in the examples described herein, however the system and method is not limited to retail or to grocery stores. In other examples, the system and method can be used in supermarkets, convenience stores, department stores, apparel stores, bookstores, hardware stores, electronics stores, gift shops, and/or other types of shopping environments.

In some implementations, the system and method can be used in combination with a monitoring system used for automated or semi-automated checkout. Herein, automated and/or semi-automated checkout is primarily characterized by a system or method that generates or maintains a virtual cart (i.e., a checkout list) during the shopping experience with the objective of tracking the possessed or selected items for billing a customer. The checkout process can occur when a customer is in the process of leaving a store. The checkout process could alternatively occur when any suitable condition for completing a checkout process is satisfied such as when a customer selects a checkout option within an application.

A virtual cart may be maintained and tracked during a shopping experience through use of one or more monitoring system. In performing an automated checkout process (i.e., "checkout-free shopping"), the system and method can automatically charge an account of a customer for the total of a shopping cart and/or alternatively automatically present the total transaction for customer completion. Actual execution of a transaction may occur during or after the checkout process in the store. For example, a credit card may be billed after the customer leaves the store. Alternatively, single item or small batch transactions could be executed during the shopping experience. For example, automatic checkout transactions may occur for each item selection event. Checkout transactions may be processed by a checkout processing system through a stored payment mechanism, through an application on a client computing device, through a conventional Point of Sale (PoS) system (i.e., checkout system), or in any suitable manner.

One variation of a fully automated checkout process may enable customers to select items for purchase (including produce and/or bulk goods) and then leave the store. The automated checkout system and method could automatically bill a customer for selected items in response to a customer leaving the shopping environment. The checkout list can be compiled using computer vision and/or additional monitoring systems. In a semi-automated checkout experience variation, a checkout list or virtual cart may be generated in part or whole for a customer. The act of completing a transaction may involve additional systems. For example, the virtual cart can be synchronized with (or otherwise transmitted to) a point of sale (POS) system manned by a worker so that at least a subset of items can be automatically entered into the POS system thereby alleviating manual entry of the items.

The system and method may alternatively be used without the combination with an automated checkout system (e.g., for fully automated or semi-automated checkout). The system and method may alternatively be implemented independently or with integration with another computing system which make additional use of components of the system and method such as the CV monitoring system. For example, the system and method may be used with an inventory or store operation management system for tracking stocking and state of a store.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method can automate the process of product placement in the physical world by leveraging sensor-based monitoring of product placement availability and compliance combined with an online marketplace for driving digital management of bids for product placement. The specially configured computing system (e.g., including the coordinated operational integration of large-area sensor monitoring systems/networks, data systems, and online marketplaces) may be used to enable systematic extraction of placement options and verified oversight of product display execution.

As another potential benefit, the system and method can scale to management of a shelf space marketplace across a range of environments. The scalability of the system and method is evident in many facets. As an example of scalability within a single store, the system and method can enable a shelf space marketplace to drive product display over multiple regions including potentially the whole store. As an example of scalability across multiple stores, the system and method can enable the shelf marketplace to drive product display over multiple stores. In some cases, this could be the same chain of stores, but could also include a diversity of store chains and/or individual chains. As one example of how the system and method introduces a form of unique technology, the system and method in some implementations may enable any owner of a physical space to install the associated sensing system and/or other computing devices such that physical space can be transformed into a marketplace-managed display. This may, for example, enable small business operators and the like to rent out display space to renters of the space.

As another potential benefit, the system and method can make for a more data-driven approach to operating a store. Products and their placement within a store can be driven based on demand and expected results. This may additionally contribute to stores being operated more efficient. As traditional approaches, stores and product manufacturers or marketers perform complex and time consuming negotiations determining product placement. Because this process is time consuming and complicated, placement can only be planned through today's approaches for a few if any products. The system and method can enable entire stores to be operated in such a way.

As a related potential benefit, the system and method can democratize the promotion of products. Previously, there was no technology that could tap into the external demand for displaying products. Through the system and method, new products, local products, products of small operations, as well as other traditional products can be promoted through competitive acquisition of shelf space in a way only large companies could afford to do through tremendous amounts of slow human negotiations. The system and method can not only make retail stores more efficient, but also make product manufacturers and promoters more efficiently sell their products in physical spaces.

As another potential benefit, the system and method can introduce a new market from which retail stores can extract value. This can lead to increased profitability of a retail environment, which can yield improvements for customers through lower cost and improved customer experience.

As another potential benefit, the system and method can offer a management interface through which retail operators may manage and/or control how shelf space is used and acquired. In this way, while the system and method can introduce an automated process by which outside entities can control the operations within various retail environments, the system and method may still preserve control and oversight into what and how shelf space is allocated. For example, a retail operator management interface may be used to set marketplace logic and options (e.g., how a shelf space is auctioned or otherwise scheduled), pricing limits, timing limits, and/or placement rules and limits (e.g., what regions are available and/or off limits via the marketplace or which product categories or types can be placed where) for example.

2. System

As shown in FIG. 1, a system for physical store labeling for computer vision applications of a preferred embodiment can include a monitoring system 110 that preferably includes a CV monitoring system 112, shelving property map 120 generated at least in part by the monitoring system 110, and an online shelf space management portal 13c, (alternatively referred to herein more concisely as the marketplace 130 wherein the shelving property map 120 is used to operate a market for shelf space usage. The monitoring system 110 is preferably used in driving operation of the marketplace 130 by informing how shelf space usage is acquired and in managing execution of shelf space usage once it is reserved/purchased.

The system is at least partially present in an environment containing the shelf space and will generally be a retail environment. However, as explained above, the environment is not limited being a retail environment. The environment that hosts the system and described herein is preferably one that has a number of locations within the environment generally referred to as shelf space even though each space may not explicitly be on a shelf and could be in any suitable location in the environment. The environment will additionally generally be one that contains a set of items or products to be displayed preferably for purchase (i.e., inventory). These items or products can be interacted with users. The interactions generally include physical selection of a product for checkout. The interactions may also include other forms of item interactions such as viewing or listening or otherwise consuming an item.

Additionally, in some variations, the system may be a distributed system that includes the communicative coupling through one or more communication channels (e.g., a data network, the internet, cellular network, or other communication network) of system components in two or more environments. For example, the system may be implemented to manage the shelf space allocation of two or more stores. Specifically, each environment will include at least one monitoring system, where each monitoring system has a coverage area (at least partially) within its associated environment. For example, each store may have a CV monitoring system or at least a set of network connected imaging devices.

Herein, reference to items preferably characterizes items intended for at least one form of identification. In a retail environment, the items may alternatively be referred to as products, where identification may refer to identification of an item-associated product identifier like a stock-unit identifier (SKU identifier), a universal product code (UPC), or any suitable type of product record. The environment will generally also include other types of physical objects such as people, environment infrastructure (e.g., shelves, lights, signage, etc.), and other types of objects. People may be described herein as users or more specifically as customers, though in some implementations, the people may not necessarily be "customers".

Preferably, at least a subset of the items is identifiable and integrated for CV-based monitoring through an item detection module. In some instances, the system may assist in the identification.

A monitoring system 110 functions to track and monitor identity of items in the environment and their locations. More specifically, the monitoring system no tracks the shelf space location of items and the item identity. The monitoring system 110 may additionally monitor and track various events such as user-item interactions like picking up an item or looking at an item. The monitoring system 110 may include one or a combination of sensing/monitoring systems. The monitoring system no may include a CV monitoring system 112, a smart shelving system, an RFID tag tracking system, and/or other suitable types of monitoring systems.

Each sensing system of the monitoring system can include one or more sensors. The sensors will be connected to a computing system that either directly processes sensor data collected from the one or more sensors. Alternatively, the sensor data may be communicated by the computing system via a network to a remote computing system (e.g., a server) which may further process the sensor data.

The CV monitoring system 112 may include one or more imaging devices that collect image data within the environment, which can be used, for example, in detecting and analyzing shelf space, item placement relative to the shelf space, and/or optionally interactions with items.

The smart shelving system may include one or more shelf-integrated sensors. A shelf integrated system could be an image sensor, a proximity sensor (e.g., using optics, acoustical waves, and/or other sensing approaches), a load sensor (e.g., a load cell), an RFID tag sensor, and/or other suitable sensors. This may be used in collecting sensor data used in, for example, tracking presence of an item, the identity/classification of an item, information concerning an item, and/or detecting interactions with an item (e.g., a product-pickup event).

The RFID tag tracking system may include an RFID tag reader and a set of RFID tags. The RFID tags will generally be integrated into the items such that presence and/or location of the RFID (and thereby the associated item/product) can be tracked. A network of RFID readers may be placed across the environment, such that items can be tracked in multiple locations within the environment.

Herein, the system is primarily described as using a CV monitoring system 112 despite variations of the system may use other types of monitoring systems.

A CV monitoring system 112 of a preferred embodiment functions to transform image data collected within the environment into observations relating in some way to items in the environment. Preferably, the CV monitoring system 112 is used for detecting items, monitoring users, tracking user-item interactions, and/or making other conclusions based on image and/or sensor data. The CV monitoring system 112 will preferably include various computing elements used in processing image data collected by an imaging system. In particular, the CV monitoring system 112 will preferably include an imaging system and a set of modeling processes and/or other processes to facilitate analysis of user actions, item state, and/or other properties of the environment.

The CV monitoring system 112 is can be configured to facilitate identifying of items, the locations of items relative to various shelf space locations, and/or detection of interactions associated with identified items. Accordingly, the CV monitoring system 112 can be used in tracking the status of stocking of products on the shelf space, verifying placement of products (e.g., compliance with a shelving directive for a given bid), and/or tracking performance (e.g., detecting events or interactions such as user viewing of an item, an item pickup, and/or an item purchase).

The CV monitoring system 112 preferably provides specific functionality that may be varied and customized for a variety of applications. In addition to item identification, the CV monitoring system 112 may additionally facilitate operations related to person identification, virtual cart generation, item interaction tracking, store mapping, and/or other CV-based observations. Preferably, the CV monitoring system 112 can at least partially provide: person detection; person identification; person tracking; object detection; object classification; object tracking; gesture, event, or interaction detection; detection of a set of customer-item interactions, and/or other forms of information.

In one preferred embodiment, the system can use a CV monitoring system 112 and processing system such as the one described in US Patent Publication No. 2017/0323376, filed on May 9, 2017, which is hereby incorporated in its entirety by this reference. The CV monitoring system 112 will preferably include various computing elements used in processing image data collected by an imaging system.

The imaging system functions to collect image data within the environment. The imaging system preferably includes a set of image capture devices (i.e., imaging devices like cameras or video cameras). The imaging system might collect some combination of visual, infrared, depth-based, lidar, radar, sonar, and/or other types of image data. The imaging system is preferably positioned at a range of distinct vantage points. However, in one variation, the imaging system may include only a single image capture device. In one example, a small environment may only require a single camera to monitor a shelf of purchasable items. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices). For example, in one implementation, the system could operate partially or entirely using personal imaging devices worn by users in the environment (e.g., workers or customers).

The imaging system preferably includes a set of static image devices mounted with an aerial view from the ceiling or overhead. The aerial view imaging devices preferably provide image data that observes at least the users in locations where they would interact with items. Preferably, the image data includes images of the items and users (e.g., customers or workers). While the system (and method) are described herein as they would be used to perform CV as it relates to a particular item and/or user, the system and method can preferably perform such functionality in parallel across multiple users and multiple locations in the environment. Therefore, the image data may collect image data that captures multiple items with simultaneous overlapping events. The imaging system is preferably installed such that the image data covers the area of interest within the environment.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous across the monitored portion of the environment. However, discontinuities of a region may be supported. Additionally, monitoring may monitor with a substantially uniform data resolution or at least with a resolution above a set threshold. In some variations, a CV monitoring system 112 may have an imaging system with only partial coverage within the environment.

A CV-based processing engine and data pipeline preferably manages the collected image data and facilitates processing of the image data to establish various conclusions. The various CV-based processing modules are preferably used in generating user-item interaction events, a recorded history of user actions and behavior, and/or collecting other information within the environment. The data processing engine can reside local to the imaging system or capture devices and/or an environment. The data processing engine may alternatively operate remotely in part or whole in a cloud-based computing platform.

The item detection module of a preferred embodiment, functions to detect and apply an identifier to an object. The item detection module preferably performs a combination of object detection, segmentation, classification, and/or identification. This is preferably used in identifying products or items displayed in a store. Preferably, a product can be classified and associated with a product SKU identifier or an alternative type of product identifier. In some cases, a product may be classified as a general type of product. For example, a carton of milk may be labeled as milk without specifically identifying the SKU of that particular carton of milk. An object tracking module could similarly be used to track items through the store.

In a successfully trained scenario, the item detection module properly identifies a product observed in the image data as being associated with a particular product identifier. In that case, the CV monitoring system 112 and/or other system elements can proceed with normal processing of the item information. In an unsuccessful scenario (i.e., an exception scenario), the item detection module fails to fully identify a product observed in the image data. An exception may be caused by an inability to identify an object, but could also be other scenarios such as identifying at least two potential identifiers for an item with sufficiently close accuracy, identifying an item with a confidence below a certain threshold, and/or any suitable condition whereby a remote item labeling task could be beneficial. In this case the relevant image data is preferably marked for labeling and/or transferred a product mapping tool for human assisted identification.

As described below, the item detection module may use information from detected physical labels to assist in the identification of products.

The item detection module in some variations may be integrated into a product inventory system. The product inventory system functions to detect or establish the location of inventory/products in the environment. The product inventory system can manage data relating to higher level inventory states within the environment. For example, the inventory system can manage a location/position item map, which could be in the form of a planogram. The planogram may be based partially on the detected physical labels. The inventory system can preferably be queried to collect contextual information of an unidentified item such as nearby items, historical records of items previously in that locations, and/or other information. Additionally, the inventory system can manage inventory data across multiple environments, which can be used to provide additional insights into an item. For example, the items nearby and/or adjacent to an unidentified item may be used in automatically selecting a shortened list of items used within the product mapping tool.

The item detection module can be used in determining a current status of product placement—determining an actual product placement map (e.g., a live planogram). This can be used in creating the shelving property map 120. The item detection module may additionally be used in verification and tracking of product placement as prescribed or requested from the marketplace 130. The item detection module can be used in verifying that a particular product (or arrangement of products) has been stocked in a particular display region of the environment (e.g., on a particular shelf space region) in accordance with a bid for shelf space placement established via the marketplace 130.

User-item interaction processing modules function to detect or classify scenarios of users interacting with an item (or performing some gesture interaction in general). User-item interaction processing modules may be configured to detect particular interactions through other processing modules. For example, tracking the relative position of a user and item can be used to trigger events when a user is in proximity to an item but then starts to move away. Specialized user-item interaction processing modules may classify particular interactions such as detecting item grabbing or detecting item placement in a cart. User-item interaction detection may be used as one potential trigger for an item detection module. Depending on the implementation, the user-item interaction processing module may be used to collect feedback or action verification for a particular placement of an item. In particular, the user item interaction processing module may be used in detecting and tracking, for example: user viewing of an item (e.g., number of users, duration of views, and/or other viewing information) and/or item pick-up events, A person detection and/or tracking module functions to detect people and track them through the environment.

A person identification module can be a similar module that may be used to uniquely identify a person. This can use biometric identification. Alternatively, the person identification module may use Bluetooth beaconing, computing device signature detection, computing device location tracking, and/or other techniques to facilitate the identification of a person. Identifying a person preferably enable customer history, settings, and preferences to be associated with a person. A person identification module may additionally be used in detecting an associated user record or account. In the case where a user record or account is associated or otherwise linked with an application instance or a communication endpoint (e.g., a messaging username or a phone number), then the system could communicate with the user through a personal communication channel (e.g., within an app or through text messages).

A gesture, event, or interaction detection modules function to detect various scenarios involving a customer. One preferred type of interaction detection could be a customer attention tracking module that functions to detect and interpret customer attention. This is preferably used to detect if, and optionally where, a customer directs attention. This can be used to detect if a customer glanced in the direction of an item or even if the item was specifically viewed. A location property that identifies a focus, point, or region of the interaction may be associated with a gesture or interaction. The location property is preferably 3D or shelf location "receiving" the interaction. An environment location property on the other hand may identify the position in the environment where a user or agent performed the gesture or interaction.

Alternative forms of CV-based processing modules may additionally be used such as customer sentiment analysis, clothing analysis, customer grouping detection (e.g., detecting families, couples, friends or other groups of customers that are visiting the store as a group), and/or the like. The system may include a number of subsystems that provide higher-level analysis of the image data and/or provide other environmental information such as a real-time virtual cart system.

The real-time virtual cart system functions to model the items currently selected for purchase by a customer. The virtual cart system may enable automatic self-checkout or accelerated checkout. Product transactions could even be reduced to per-item transactions (purchases or returns based on the selection or de-selection of an item for purchase).

The CV monitoring system 112 may additionally be configured to identify and classify shelf space in the environment. A shelf space classifier module may process the image data to determine location of available shelf space. In one variation, the detection of shelf space may additionally include dimensioning shelf space so that stocking/packing of the shelf space can be modeled. Additionally or alternatively, the shelf space may be segmented based on the available "positions" in the shelf space. Furthermore, the CV monitoring system 112 could classify and create descriptive labels for portions of shelf space in a retail marketplace. These labels may include labels such as "aisle", "cereal aisle", "produce section", "organic produce bin", "and refrigerator". Additionally or alternatively, the shelf space may have portions of it manually labeled or specified. Region labels can be used in creation of or supplementing the shelving property map 120.

The shelving property map 120 functions to model the shelf space and properties of the shelf space. The shelving property map 120 can be a data model that records product stocking at a given shelf space location. The shelving property map 120 may be a historical data model, recording time organized records of the status of product stocking at various times. The shelving property map 120 may model these properties for one specific store, but may additionally model across the shelf space of multiple retail environments. In one preferred variation, the shelving property map 120 can report a shelf space expected value, product relevance metric, shopping performance score, and/or shelf space characteristics. The shelving property map 120 may be used to facilitate searching and sorting shelf space options within the shelf space marketplace 130, valuing shelf space, measuring relevance of products for a given shelf space, and/or reporting on other aspects of the shelf space.

The shelving property map 120 can be stored on a computer-readable medium (e.g., a non-transitory computer-readable medium), which may include one or more database systems. The shelving property map 120 can be a queryable system used for data analysis and processing of shelving/item related data, and/or for retrieving data in response to various forms of queries. In one example, a shelving property map 120 may maintain a data record of each particular environment as well as one or more generalized map of product placement.

The shelving property map 120 may record and/or model various aspects of the shelf space such as product history, nearby or adjacent product history, interaction history, shelf space characteristics, and/or other properties.

The product history can preferably be a record of the identities of previous products stocked for a given shelf space location, characteristics of products stocked for a given shelf space location, time duration of products being displayed at a given shelf space location.

The adjacent product history may record and allow exploration into the identities, characteristics, and time duration of a product being displayed at a particular nearby location for products stocked next to or near a given shelf space location.

The interaction history may be a log of various types of events. One preferred event can include a product purchase event. The product purchase event is preferably logged for a given shelf space location when a product from a given location is purchased. This may include tracking the selection of a product and confirming an eventual purchase of the product. Another type of event can include a customer attention event, which may be characterized as a customer viewing, picking up, or performing some other action indicative of giving the product at that location its attention. Other events such as put-backs (placing a product back on the shelf) may additionally or alternatively be tracked.

These various forms of data may be stored and modeled separately, but may alternatively be combined. For example, the product history and interaction history may be integrated such that the data records include properties indicating historical records on product information and interactions.

In some variations, the system may additionally include a product inventory system, which may include a planogram model. This may be part of or a complimentary component to the shelving property map 120. The product inventory system of a preferred embodiment functions as a real-time inventory system that manages product information in the store. The product inventory system may be a database (or databases) of product information detailing product name, information, identifiers, associated labels, price, discounts, images, categories, associated brands/manufacturer information, packaging, locations, and/or any suitable information. The product inventory system is preferably maintained to reflect a real-time record of the inventory in a store.

In one variation, the product inventory system may include a planogram model system. The planogram model system functions to manage the environment map of product placement. The planogram model system preferably includes a database or data storage configured to store a data model characterizing how product items are mapped to various locations in the environment. The planogram model system is preferably maintained and updated in real-time (or at least substantially real-time). In alternative variations, the planogram model system can be periodically updated.

The locations may be specified by three-dimensional position within the store. The position could be specified through coordinates. The position may additionally or alternatively be specified by descriptor labels such as aisle 7, section 5, and shelf 3 for example. The location may alternatively be a two-dimensional position, which would specify where in the (two-dimensional) store layout a product is stored. In yet another variation, the locations may be based on image data, wherein product placement is associated with the location captured and modeled in the image data. The planogram model system may describe discrete expected product locations. Alternatively, the planogram model system can provide a probabilistic model of product position.

Since a product may be stored in multiple locations, a product may be associated with multiple storage locations, which can include intended storage locations and unintentional storage locations during incorrect re-shelving of a product.

The planogram model system is preferably queryable such that the location of a product can be identified, or a set of products may be determined based on proximity to a particular location. Various types of queries may be made. In one variation, the expected or predicted location of products may be probabilistic where position is reported as a probability map.

The planogram model system, in one variation, can include or interface with a plan-of-record planogram model, which functions as the description of a target or intended positioning of products. The plan-of-record model can be used to detect deviations from the expected layout of products.

The online shelf space marketplace 130 functions as the channel through which various entities can engaged with the marketplace and participate in setting the products to be shelved.

The shelf space marketplace 130 preferably enables a user to create an account and then, through that account, book shelf space to be used in some way. Generally, booking shelf space usage will trigger stocking of one or a set of products at particular shelf space location. Booking shelf space usage in some variations may alternatively be used so that a display or some alternative use of the shelf space may be used.

The marketplace 130 (i.e., a shelf space management portal) preferably includes a marketplace user interface through which the accounts can book the shelf space. When booked, an account can be granted a shelf space usage option. That usage option may be associated with a particular type of usage (e.g., stocking product X for two weeks). The shelf space usage option is generally for some period of time, but may alternatively be conditional on various metrics such as sales, impressions, or other suitable conditions.

In one variation, the marketplace user interface can include: a shelf space query interface for configuring, searching for, and/or specifying requested shelf space. Different variations of the system and more specifically, the marketplace 130 may enable different models for the marketplace user interface depending on the type of marketplace.

Variations of the system and marketplace 130 may offer ways of booking a shelf space usage option using marketplace models including, for example: dynamically priced booking; personalized dynamically priced booking (e.g., customized to display request); performance-driven marketplace; auction based booking; quality-based booking; and/or automated shelf space allocation.

In a dynamic-price booking variation, shelf space may be booked directly. In general, a query interface may be used to identify a specific shelf space or a descriptor of shelf space characteristics, and then the shelf space can be booked to reserve a shelf space usage option for a particular account (and an associated product). The query interface may be specially configured to render a presentation of shelf space options for booking, which may include user interfaced elements and server operations specifically configured for selecting shelf space, configuring shelf space usage (e.g., product for display, any special arrangement instructions, signage, and/or display instructions), and then possibly going through a confirmation process. The confirmation process may include initiating (and optionally completing) a transaction to "purchase" the selected shelf space usage option. In this variation, a value is generated for different shelf space locations, and accounts can book use of the shelf space. The shelf space usage option is generally for some period of time, but may alternatively be conditional on various metrics such as sales, impressions, or other suitable conditions.

As one dynamically priced shelf space marketplace example, an account holder may search for various shelf space usage windows available across one or more different stores. Specific shelf space options can be presented along with prices automatically calculated based on various factors such as the shelving property map, performance data, current planogram, operational cost measurement, operator configuration, and/or other factors.

As another dynamic-price shelf pace marketplace example, the dynamic-price shelf space option may be for a generalized shelf space option that may be present in many environments or at some point in the future available. In such a variation, an account holder may search for general shelf space characteristics where one or more shelf space usage options may be presented with a value calculated from a plurality of environments. In one exemplary usage scenario, an account holder wanting to promote a new cereal may submit shelf space characteristics specifying: cereal aisle, store-front aisle section, mid shelf, not adjacent to product X. From this descriptor, a value for a shelf space usage may be dynamically calculated.

In a personalized dynamically priced booking variation, shelf space may be booked directly using a displayed shelf space value but where the shelf space is priced based on the specific display objectives of the request. In other words, the price of a shelf space option can depend on the account (e.g., the brand, other managed products, etc.) and/or the product display instructions (e.g., the product information and optionally any other display instructions) This variation may be substantially similar to the dynamically-price In a performance-driven marketplace variation, booking may involve an account selecting various performance targets, which are then used in guiding how products are stocked on the shelf. This can be a form of automated shelf space selection, where the system uses various conditions set by an account holder to inform how it manages shelf space allocation across various retail environments. The price for selecting performance targets may vary based on various conditions. In one example, a product promoter may select to have 3000 positive impressions (product consideration or purchase) of a product by female shoppers in the state of Missouri. Depending on demand for such performance targets, the account may be performed some rate for setting that target and/or executing that target.

In an auction-based marketplace variation, booking is performed using an auction engine of the shelf space marketplace 130. The auction engine is preferably a computer implemented set of instructions that when executed cause the computer to manage an auction process for collecting bids to use shelf space and then selecting which bids to grant the shelf space usage option. In a general auction-based marketplace variation, different accounts can place bids for different shelf space usage options. The highest bid(s) can be selected as the awardee of the shelf space usage option. An auction may be performed for individual shelf space options in one or more environment. An auction may alternatively be performed for a general descriptor of shelf space options within multiple environments. The auction-based marketplace may include use of a dynamic price and/or other bid conditions (e.g., a minimum bid amount) to set rules for execution of an account.

In a quality-based booking variation, an auction-based marketplace may incorporate a quality assessment into the awarding of shelf space usage option. In this variation, product display relevancy and/or performance may factor into selecting a bid for awarding. The auction can preferably factor in various factors such as the bid value (e.g., money value to be paid), the product relevance, product performance, and/or other factors. Product relevance may be a metric calculated based on a comparison of product information of the bid's associated product and currently, previously, and/or statistically likely adjacent products; product quality score (e.g., newness of product, sales history, performance history, similar product scores), brand quality score (e.g., sales history of all brand products, performance history of all brand products), and/or other factors expanding assessment of bid beyond just the bid price.

In an automated shelf space allocation variation, the marketplace may automatically allocate and assign shelf space, which may reduce the work involved in booking shelf space placement for a party attempting to promote a product. In this variation, an account may set basic properties such as the product desired for promotion and potentially some rules or pricing metrics. The marketplace collects all these various shelf space booking objectives from multiple accounts and then performs an automated allocation of available shelf space. A selection process may be optimized for various factors such as revenue, sales volume, performance (e.g., # of customers), work involved in adjusting stoking of shelves, and/or a combination of factors.

The online shelf space marketplace 130 may provide a wide variety of interfaces for exploring available shelf space options. A graphical user interface may be used. Alternatively, a programmatic interface (e.g., an application programming interface (API)) can enable various systems to integrate with the shelf space marketplace 130.

In one variation, an entity may bid on shelf space based on general properties. This can then be used in booking shelf space for a specific location of shelf space in a general store. Use of general properties functions to abstract the concept of shelf space booking away from individual pieces of shelf space real estate. This can be useful for example, so that nationwide product manufacturers can promote their products in hundreds or thousands of stores in an efficient way without having to individually book each individual piece of shelf space.

Additionally, the system may include a store operator management interface, which functions to provide a management interface whereby a store operator and/or chain operator can manage participation in the marketplace. The store operator management interface can enable an environment configuration record to be created and stored within the system. The store operator management interface can be a graphical user interface which may be accessible through a website or an application. The graphical user interface can be used in setting the environment configuration record. Additional or alternative store operator management interfaces may alternatively be used for setting an environment configuration record. For example, an API may be provided for programmatically setting the environment configuration record.

Various conditions, rules, and preferences may be set as part of the environment configuration record. The environment configuration record may include shelf space location designation properties, which functions to indicate which shelf spaces (or other display areas) are permitted, restricted, and/or prohibited from being offering through the marketplace 130.

The environment configuration record may include shelf space conditional rules, which may allow restrictions on product type, product displays, and/or other conditions. That shelf space conditional rules may be set for the entire environment and/or set for a particular subset of shelf space locations.

The environment configuration record may also or alternatively include properties defining minimum price, maximum price, time duration, stocking restrictions, marketplace options (e.g., type of auction and/or settings of the auction).

The system may additionally include an inventory operational interface, which functions to provide a mechanism through which stocking directives can be communicated. In one variation, stocking directives maybe communicated through way of reports which may be sent through a digital communication channel and/or automatically printed. In one implementation, the specific stocking changes may be highlighted indicating the stocking changes. In some instances, currently stocked inventory may require rearrangement or reshelving to make space for promoted positioning of a product.

In one variation, the inventory operational interface includes integration with an inventory management system used when stocking shelves. Shelf space usage options booked through the marketplace may initiate communication with an inventory management system of a particular environment such that a stocking instructions for product of a shelf space usage option is updated to reflect the optioned position. When a worker scans a product (e.g., using a barcode scanner) the appropriate stocking instructions can be retrieved and displayed.

In one variation, the delivery and communication of these stocking directives may be dynamically executed based on monitoring of unstocked and/or stocked inventory. For example, a stocking directives may be initiated when the current products in that location are running low or may be more easily adjusted to a different location.

3. Method

As shown in FIG. 3, a method for inventory stocking management can include collecting sensor data from at least one environment and generating a shelving property map S10, operating a shelf space management portal interface S20 enabling external parties to use a client computing device to submit a digital shelf space usage request which may then result in a shelf space usage option; and directing operations of shelf space stocking based on the shelf space usage options S30.

The method can be used in operating an online shelf space management portal (e.g., a shelf space online marketplace) such that product placement on shelves can be managed within a retail environment at least partially based on external requests of outside entities. In some variations, servicing requests and/or fulfillment of resulting shelf space usage options may be accompanied by a payment transaction. For example, the method may be used for enabling paid product placement. The method functions to manage logistical operations leveraging real-time sensing capabilities and data management. In particular, the method can enable such product placement requests to be easily requested and scalably fulfilled across a large number of retail environments.

In one preferred implementation, the method is used to enable a bidding process by which different entities can place products in stores if they are selected. In some variations, a product placement request may be selected based on the value they place on the shelf space placement, the product characteristics (quality and/or relevance), availability and dynamic stocking requirements, and/or predicted performance impact of the product placement. As is also described, other variations of the method may enable different models for allowing outside entities to influence shelf space allocation. Furthermore, the method can enable operation of a shelf space marketplace in a way that conforms to real retail space operations.

The method may alternatively be operated independently from or without association with a marketplace. In other variations, the method may enable various shelf space usage requests originating from other sources to be better managed and fulfilled. For example, the method may be used by a store operator to manage various contractual obligations negotiated. For example, a retail operator can enter several product placement objectives into a specially configured computer system implementing the method, execution of the method can then automate fulfillment of the specified objectives and perform sensor-based auditing and confirmation across a large number of stores.

The method can be performed for a single retail environment. More preferably, the method can be performed across a set of retail environments (i.e., different stores). For example, the method may be used so that a shelf space marketplace can be used across a chain of supermarkets.

The method is preferably implemented by a system such as the one described above. Any variations of the system may be appropriately applied within the method, and similarly variations of the method may be implemented through the system. The method may alternatively be implemented by a system other than the one described above.

In general, method of collecting sensor data from at least one environment and generating a shelving property map S10, operating a shelf space management portal interface S20 enabling external parties to use a client computing device to submit a digital shelf space usage request which may then result in a shelf space usage option; and directing operations of shelf space stocking based on the shelf space usage options S30 can be implemented through a series of processes used in sensing the environment and maintaining a shelving property map, maintaining a database of shelf space usage options through the shelf space management portal interface and then performing one or more actions in connection with fulfillment of shelf space usage options. Accordingly, as shown in FIG. 4, the processes S10, S20, and S30 of the method may be performed through: operating a monitoring system with a distributed network of sensor-devices within at least one environment and collecting sensor data Silo; maintaining a shelving property map based in part on the sensor data S120; operating the shelf space management portal interface comprising: receiving, through a shelf space management portal interface, a plurality of shelf space usage requests S132, in association with at least one request, allocating a shelf space usage option within a shelf space management database system, wherein each shelf space usage option specifies fulfillment parameters including at least one product identity and a set of shelf space placement parameters S134; and directing operations of shelf space stocking based on the shelf space usage options S140 which can comprise: communicating stocking directives for a selected shelf space usage option S144 and verifying fulfillment of the selected shelf space usage option through the sensor data S150.

As one potential method variation, the method may function to automate the fulfillment of various shelf stocking objectives and/or obligations. The stocking objectives (e.g., potential candidates) and/or obligations (e.g., pre-selected, awarded, and/or otherwise agreed upon) can be stored and managed within a shelf space management database system.

Furthermore, the fulfillment of any shelf stocking objectives and obligations may be automatically verified using sensing technology.

Figure 5:
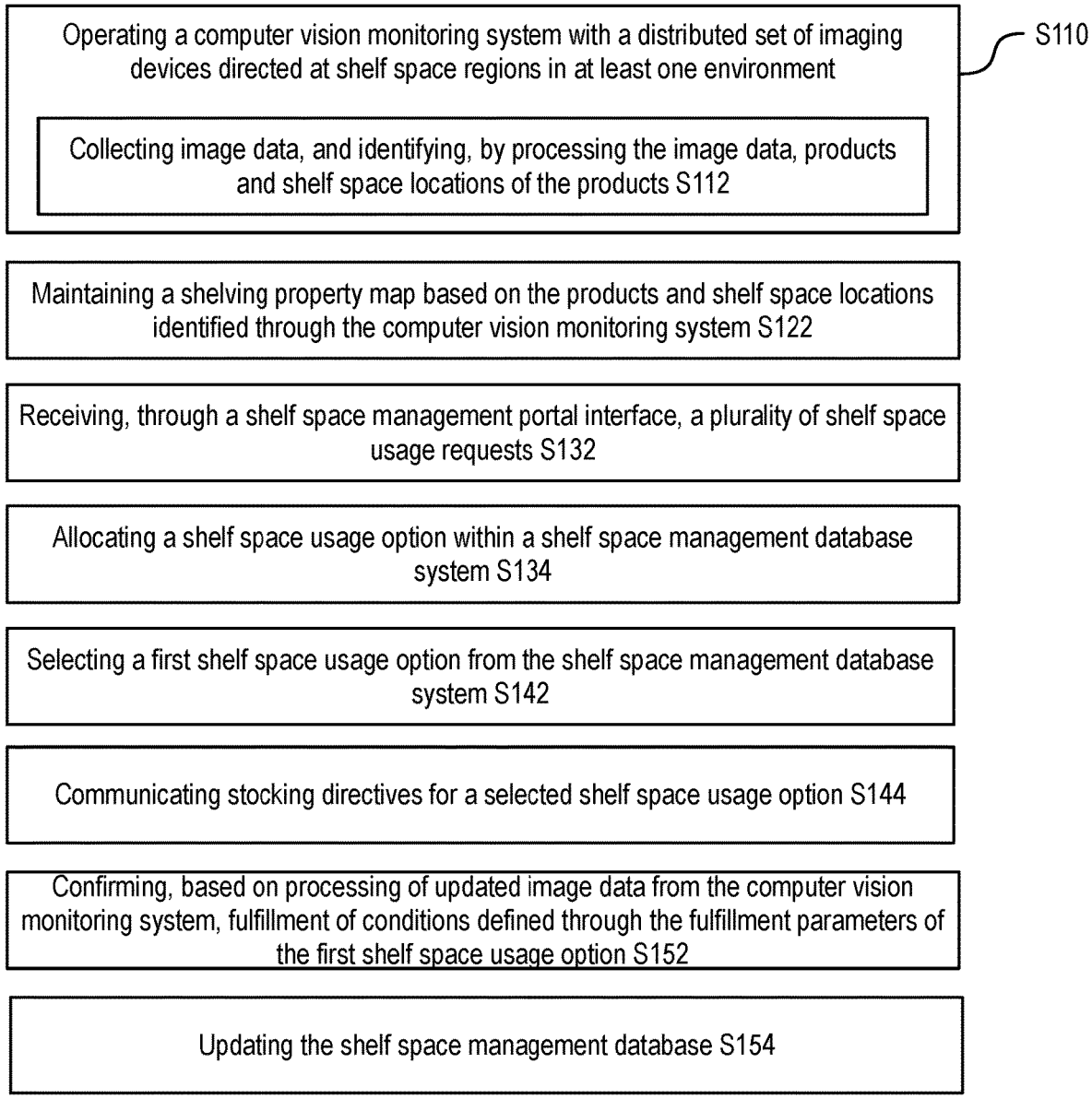

As shown in FIG. 5, such a method variation may include: operating a computer vision monitoring system with a distributed set of imaging devices directed at shelf space regions in at least one environment Silo, wherein operating the computer vision monitoring system comprises: collecting image data, and identifying, by processing the image data, products and shelf space locations of the products S112; maintaining a shelving property map based on the products and shelf space locations identified through the computer vision monitoring system S122; receiving, through a shelf space management portal interface, a plurality of shelf space usage requests S132; in association with at least one request, allocating a shelf space usage option within a shelf space management database system, wherein each shelf space usage option specifies fulfillment parameters including at least one product identity and a set of shelf space placement parameters S134; selecting a first shelf space usage option from the shelf space management database system S142; communicating stocking directives for the first shelf space usage option S144; confirming, based on processing of updated image data from the computer vision monitoring system, fulfillment of conditions defined through the fulfillment parameters of the first shelf space usage option S152 and, in response, updating the shelf space management database S154.

The selection of shelf space usage options and the communication of stocking directives may be dynamically updated based on sensed real-time (or substantially real-time such as data from current day or week) conditions. In a way, such a shelf space usage fulfillment functionality of the method variations described herein serves as a load balancer for optimizing how various partner requests can be served.

In some method variations, the method may be performed without directing stocking activities. The method can manage the collection and management of various potential shelf space usage options and then performing sensor-based monitoring of the environment for detecting fulfillment of conditions of one such shelf space usage option. In this way, the store operator can perform and supply directions in any suitable manner. Furthermore, this variation is reactive such that fulfillment is conditional on if and when a retail environment stocks products in a way that satisfies one or more shelf space usage options.

As shown in FIG. 6, such a method variation may include: receiving, through a shelf space management portal interface, a plurality of shelf space usage requests S232; in association with at least one request, allocating a shelf space usage option within a shelf space management database system, wherein each shelf space usage option specifies fulfillment parameters including at least one product identity and a set of shelf space placement parameters S234; operating a computer vision monitoring system S210 with a distributed set of imaging devices directed at shelf space regions in at least one environment; collecting image data, and identifying, by processing the image data, products and shelf space locations of the products S212; maintaining a shelving property map based on the products and shelf space locations identified through the computer vision monitoring system S220; confirming, based on processing of updated image data from the computer vision monitoring system, fulfillment of conditions defined through the fulfillment parameters of the first shelf space usage option S252 and, in response, updating the shelf space management database S254.

In some variations, the method may leverage data insights from the monitoring system and/or other data sources in assigning values to shelf space locations. Those values can be used in purchase processing or auction processing of various shelf space usage requests when operating a shelf space management portal interface (e.g., a shelf space marketplace). These values may also or alternatively be used in selecting shelf space usage options for fulfillment and/or for initiated transactions after completing fulfillment.

As another variation, the method may incorporate performance-based metrics which can be used for automated tracking and/or for performance based transactions. For example, the method may enable a shelf space marketplace to offer shelf space usage that is billed based on the performance results.

Figure 2:
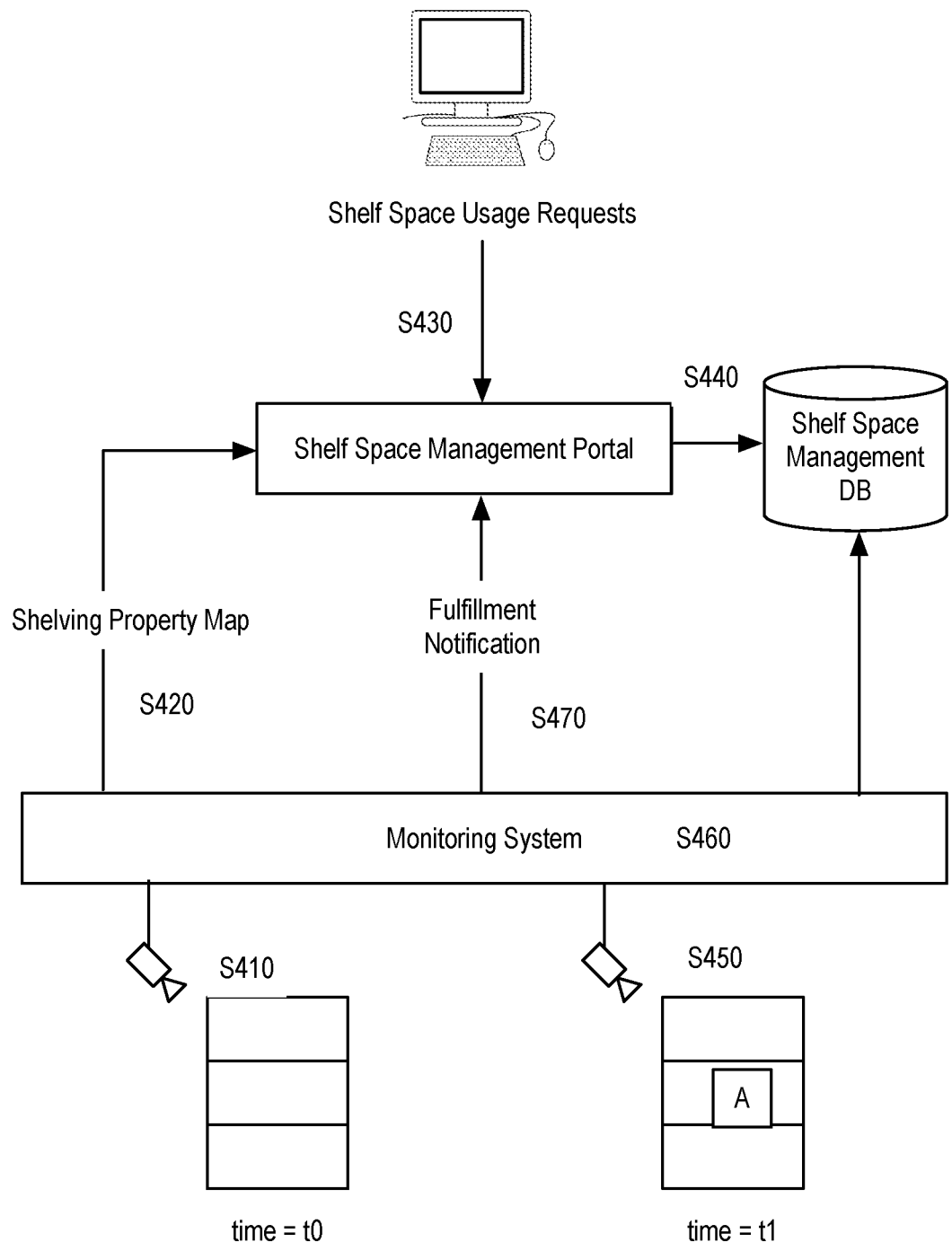
FIG. 2 is a schematic representation of an exemplary method implementation.

As shown in FIG. 2, the monitoring system in addition to or as an alternative to confirming fulfillment may be used in driving operation of the shelf space management portal. For example, a shelving property map may be used in determining candidate shelf space availability presented and offered within a marketplace variation of the management portal and/or for assigning value/cost to different shelf space usage stock. In this example, as shown in step S410, a CV monitoring system collects image data and transforms that into an interpretation of the state of the product shelving in a retail environment (i.e., generates a shelving property map). As shown in step S420, the property map is communicated and synchronized with the shelf space management portal (e.g., an online marketplace). As shown in step S430, one or more requests may be made to the management portal. These requests will generally be inquiring into or attempting to book product placement. The shelving property map can be used in driving that process by setting values, determining availability, and showing options. As shown in step S440, a request may be converted to a shelf space usage option that is monitored and/or communicated for fulfillment. In step S450, the CV monitoring system may detect a product A properly placed in a store per the shelf space usage option. In step S460, verification of fulfillment can be performed comparing CV observations (as indicated in an updated shelving property map) and the parameters of the shelf space usage option. Then, depending on the implementation, a fulfillment notification can be transmitted as shown in S470. In some variations, this may be communication to initiate a transaction in exchange for fulfilling the product placement of product A.

In some variations, the method may be implemented as a method for a digitally managed shelf space marketplace, wherein an online marketplace is provided through which external parties can use a client computing device to interface with the online marketplace for managing, purchasing, and/or bidding for shelf space usage options. In such variations, the shelf space management portal will generally be an online shelf space marketplace. The marketplace can be a website with an account interface through which account holders can place product placement orders. These orders may be processed in a variety of different ways depending on the implementation and/or configuration of the marketplace.

Accordingly, some variations of the method may include: operating a computer vision monitoring system with a distributed set of imaging devices directed at shelf space regions in at least one environment, wherein operating the computer vision monitoring system comprises: collecting image data, and identifying, by processing the image data, products and shelf space locations of the products; maintaining a shelving property map based on the products and shelf space locations identified through the computer vision monitoring system; operating an online marketplace based in part on the shelving property map, which comprises rendering a booking interface of shelf space marketplace options; receiving, through the booking interface, shelf space usage requests; and for at least a subset of the shelf space usage requests allocating a shelf space usage option within a shelf space management database system, wherein each shelf space usage option specifies a fulfillment cost and a fulfillment parameters including at least one product identity and a set of shelf space placement parameters; selecting a first shelf space usage option from the shelf space management database system; communicating stocking directives for the first shelf space usage option; confirming, based on processing of updated image data from the computer vision monitoring system, fulfillment of conditions defined through the fulfillment parameters of the first shelf space usage option and, in response, updating a transaction for the fulfillment cost of the first shelf space usage option. In some variations, the transaction may be initially performed but then finalized when updated. In other variations, the transaction may only occur if and after confirmation of fulfillment. Other approaches to managing when and how much a transaction should be may alternatively be used.

The method may incorporate other variations, such as models for awarding or otherwise allocating, dynamic sensor-based approaches for selecting when to direct stocking for a shelf space stocking option, performance based tracking and billing for product placement, and other variations described herein.

Block S110, which includes operating a monitoring system and collecting data, functions to monitor the state of one or more retail environments. Collecting data preferably includes collecting sensor data. The monitoring system preferably collects sensor data from a distributed network of sensor-devices within at least one environment. The sensor-devices preferably monitor and track inventory and/or product placement and product identity.

Collecting data can include collecting image data from a CV monitoring system. Accordingly, S110 may include operating a computer vision monitoring system with a distributed set of imaging devices directed at shelf space regions in at least one environment. Operating the computer vision monitoring system may include collecting image data, and identifying, by processing the image data, products and shelf space locations of the products. Additional or alternative processing of the image data may alternatively be performed.

Collecting data may additionally include sensing shelf activity or data from a smart shelving unit, tracking RFID or other forms of product tags, and/or collecting sensor data from other suitable types of monitoring systems. The monitoring system may include one or more different types of monitoring systems including a CV monitoring system and/or other inventory monitoring systems such as smart shelves, product tagging/tracking systems, and/or Radio Frequency Identification (RFID) based tracking system.

Other sources of data may include transaction data from a point of sale system, inventory data, stocking data, loyalty card program data, and/or other suitable sources of data. In some cases, a form of sensor data is used in extracting information from the collected data.

The collected data (sensor data, image data, and the like) may be used at various and possible multiple stages of the method. In one variation, the collected data can be used in verifying fulfillment of a shelf space usage option. Products can be sensed as being displayed as specified in a shelf space usage option. In another variation, the collected data may be used in interpreting the current state of shelf space and inventory so that product placement can be performed for a space that is available, will soon be available, or can easily be made available. In another variation example, sensor data can be used in interpreting the shelf space usage availability across one or more environments, which is may then be used to present a set of candidate shelf space usage options for possible selection by a user of a marketplace. As another exemplary variation, collected sensor data can be used in interpreting value of a particular shelf space or shelf space properties. In this way, collecting of data can be performed continuously or at least periodically.

Collecting image data, functions to collect video, pictures, or other imagery of an environment. The image data is preferably captured over a region expected to contain objects of interest (e.g., inventory items) and interactions with such objects. Image data is preferably collected from across the environment from a set of multiple imaging devices. Preferably, collecting image data occurs from a variety of capture points. The set of capture points include overlapping and/or non-overlapping views of monitored regions in an environment. Alternatively, the method may utilize a single imaging device, where the imaging device has sufficient view of the exercise station(s). The image data preferably substantially covers a continuous region. However, the method can accommodate for holes, gaps, or uninspected regions. In particular, the method may be robust for handling areas with an absence of image-based surveillance such as bathrooms, hallways, and the like.

The image data may be directly collected, and may be communicated to an appropriate processing system. The image data may be of a single format, but the image data may alternatively include a set of different image data formats. The image data can include high resolution video, low resolution video, photographs from distinct points in time, image data from a fixed point of view, image data from an actuating camera, visual spectrum image data, infrared image data, 3D depth sensing image data, parallax, lidar, radar, sonar, passive illumination, active illumination, and/or any suitable type of image data.

The method may be used with a variety of imaging systems, collecting image data may additionally include collecting image data from a set of imaging devices set in at least one of a set of configurations. The imaging device configurations can include: aerial capture configuration, shelf-directed capture configuration, movable configuration, and/or other types of imaging device configurations. Imaging devices mounted over-head are preferably in an aerial capture configuration and are preferably used as a main image data source. In some variations, particular sections of the store may have one or more dedicated imaging devices directed at a particular region or product so as to deliver content specifically for interactions in that region. In some variations, imaging devices may include worn imaging devices such as a smart eyewear imaging device. This alternative movable configuration can be similarly used to extract information of the individual wearing the imaging device or other observed in the collected image data.

Collecting image data is preferably accompanied by processing the image data for information extraction. This may include classifying objects from the image data, tracking object locations in the environment, detecting interaction events. These processes may be used in other areas of CV processing in the method. With respect to monitoring inventory and user interactions with inventory, CV processing can include: classifying product items from the image data from within the retail environment; tracking user location in the environment; and detecting user-item interaction events. The method may additionally include tracking a checkout list according to object classifications, user location, and the detected interaction events. This may be performed as part of automated checkout. However, this could also be used in tracking and detecting if and when products are purchased. Monitoring commerce activity preferably includes iteratively processing the image data and applying various image data analysis processes.

In some variations, tracking of a checkout list of a user may be used as part of tracking performance for shelf space usage.

Classifying objects from the image data functions to perform object detection. Objects are detected and classified using computer vision or other forms of programmatic heuristics, artificial intelligence, machine learning, statistical modeling, and/or other suitable approaches. Object classification can include image segmentation and object identification as part of object classification. Resulting output of classifying objects of image data of a single image or video stream can be a label or probabilistic distribution of potential labels of objects, and a region/location property of that object. Classifying objects in a single image of the image data can yield multiple object classifications in various regions. For example, an image of a shelf of products with a shopper present can yield classifications for each visible product, the shelf, and the shopper. Specifically, classifying an object, in the context of items on a shelf space or display can include identifying a product identifier for a detected product.

Various techniques may be employed in object classification such as a "bag of features" approach, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes.

Image feature extraction and classification is an additional or alternative approach, which may use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques.

Additionally, multiple variations of algorithmic approaches can be implemented in accounting for particular classes of object classification. A hierarchical classification process can be used in iteratively refining classification and/or bounding the classification challenge for enhancing classification confidence and/or speed. In one variation, classifying objects can be limited or isolated to updating based on changes in image data. In one variation, classifying objects of image can be limited to subregions of the image data satisfying a change condition. For example, an image of a shelf of products with a shopper in the lower right quadrant of the image may only have object classification executed for a region within that lower right quadrant, which can alleviate the method from reclassifying products that are static in the image data.

In some variations, object classification can be actively confirmed or informed through another data input channel. For example, a calibration tool may be used for logging an object with a confirmed classification (e.g., a SKU identifier), location, and time.

Classifying objects preferably includes identifying a product identifier for visible products. The product identifier may be SKU or data record of a product, which may include various pricing information that can be used in adding the item as an invoiced item if selected. The product identifier can additionally be used in retrieving product related information. In one variation identifying a product identifier may be used in querying product information from a product information database. Information such as product type, classification, manufacturer, product attributes (e.g., organic, gluten free, etc.) can be retrieved which may be used in determining how the product relates to neighboring displayed products and/or how other products would relate to it. Additionally, the product identifier can be used in querying transaction data to determine the sales data for a particular product. Tracking of sales data as a function of stocking display can be used to determine, predict, or otherwise assign a value to a various shelf face properties (e.g., a specific shelf position and arrangement, or general placement properties).

Tracking objects in the environment functions to monitor the location of an object in establishing an object path. Tracking an object can include tracking the object within image data from a single image capture device but more preferably tracks the object across image data from multiple image capture devices. Tracking an object can additionally be used in identifying and associating objects across image capture devices.

Tracking objects in the environment can, in some variations, include tracking people (i.e., users) in the environment. Tracking users functions to maintain association of a user with collected payment mechanism and/or vehicle station. Tracking objects in the environment may additionally be used in tracking items as they move through the store and their association with a user, which can signal an intention to purchase.

Tracking an object can include applying CV-based object tracking techniques like optical flow, algorithmic target locking and target re-acquisition, data-driven inferences, heuristical processes, and/or other suitable object tracking approaches. In the case of person tracking a variety of person tracking techniques may be used. CV-based object tracking and algorithmic locking preferably operate on the image data to determine translation of an object. Data-driven inferences may associate objects with matching or similar data features when in near temporal and spatial proximity. "Near" temporal and spatial proximity can be characterized as being identified in a similar location around the same time such as two objects identified within one to five feet and one second. The temporal and spatial proximity condition could depend on various factors and may be adjusted for different environments and/or items. Objects in near temporal and spatial proximity can be objects observed in image data from a neighboring instance of image data (e.g., a previous video frame or previously capture image still) or from a window of neighboring instances. In one variation, a window of neighboring instances can be characterized by sample count such as the last N media instances (e.g., last 10 video or still frames). In another variation, a window of neighboring instances can be characterized by a time window such as media instances in the last second.

Detecting interaction events functions to identify and characterize the nature of changes with at least one object. Interaction events can be detectable changes observed in the image data. Preferably, interaction events can be used in applying compound object modeling and multi-state modeling. An interaction event can additionally include triggering updating the checkout list.

Detecting an interaction event preferably includes detecting a user-item interaction which can be CV-based detection and/or classification of an event observed in the image data involving interactions of a user with a monitored object. Monitored objects preferably include products for purchase and/or items for use.

Detecting user-item interactions may include: detecting a user selecting of a product and thereby adding the associated item to the checkout list and optionally detecting a user deselecting of (e.g., setting down) a product and thereby removing the associated item from the checkout list. Detecting user-item interactions for usage-based interactions may include detecting use or consumption of an item. Detecting usage may include actions such as detecting dispensing of a drink from a drink machine or making use of amenities such as a waiting room or watching media.

Furthermore, detecting user-item interactions may include detecting directed user attention, which can include estimating user pose and attention relative to a product and/or shelf space location.

In some cases where the method includes tracking and use of performance metrics, detecting user attention may be used to count the number of customers/users that viewed a product and/or the duration of customers viewing a product for example.

Block S120, which includes maintaining a shelving property map based in part on the sensor data, functions to create a data model by which queries and interpretation of shelf space can be made. The shelving property map is preferably maintained in that it is generated or created and then periodically updated. The shelving property map is updated continuously or periodically in response to new or update sensor data and interpretation of such data. Preferably, maintaining the shelving property map includes maintaining the shelving property map based on the products and shelf space locations identified through a computer vision monitoring system S122 collected data from other monitoring systems or data sources.

The generated shelving property map can model a variety of aspects of the shelf space in an environment, products within the environment, customers, and/or other aspects. Information extracted by a monitoring system such as described for CV monitoring above is preferably used.

Maintaining the shelving property map can include modeling shelf space properties in an environment. As one aspect this can include modeling shelf properties such as store information, location, aisle information, shelf number, column information, and/or other suitable information used in characterizing the shelf space. These may be fairly physical properties that can be used to build a map of where different shelf spaces are located and how they are generally used. At a more granular level, this may include characterizing traits of individual shelf space locations which may include analyzing product stocking history at and nearby given locations. This may be used, for example, to understand that a particular section is used for stocking healthy, organic breakfast food options while another location is historically used by brand name cereals marketed to kids.

Modeling space properties may include tracking product shelving properties such as if products are stacked/front facing orientations, tidiness of stocking, missing inventory, and/or other aspects of how a product is stocked in a particular location. This may be used to understand stocking traits of different shelf space locations, regions of a store, and/or for a particular store.

Maintaining the shelving property map may additionally include, in association with the shelving property map, tracking item activity, which functions to monitor what events happen for different products and/or shelf space locations.

Item activity can include detecting user attention to a product and/or shelf space location. In one implementation this can include doing a form of pose estimation of a detected human to detect when the human is directing attention to a particular location. User attention may additionally be characterized in one of a set of different classifications. There may be positive forms of attention or negative forms of attention.

Item activity may include detecting purchase events of a product from a particular location. This may include detecting selection of a product by a user, and tracking the user and monitoring for a purchase event of the product by the user. When the method is implemented by an automated checkout system, the purchase information may be supplied by a virtual cart checkout system.

Item activity may additionally or alternatively include item pickup events, which can include picking up of a product (for purchase and/or inspection) and/or placing down of a product (e.g., restocking). Placing down may happen at the same shelf space location where a product was selected but could additionally happen elsewhere.

Maintaining the shelving property map may additionally include, in association with the shelving property map, modeling item characteristics, which functions to track various properties of products. This may involve analyzing how the product is stocked and what products are stocked nearby. For example, a particular type of cereal may be characterized as "healthy" based on common products shelved adjacent to it or nearby. It may additionally include pulling information from external data sources such as online stores and review sites and/or other sources of product information.

In some cases, some of the above information used for the shelving property map may be supplied through manual entry or from using an external data source. In general, at least a portion of the data used in generating the shelving property map is obtained from the monitoring system.

Additionally or alternatively, the shelving property map may characterize properties of a specific product by adjacent products and/or placement metadata.

The collected data is preferably processed and applied to extracting various forms of information. That information may be modeled within the shelving property map. Additionally or alternatively, the information may be further processed to generate and/or update other data models relating to products and the shelf space.

The shelving property map can be a single data structure, but the shelving property map may include multiple data structures and/or data systems.

In one variation, the shelving property map in one variation can calculate and maintain shelf space estimated value. This value may be the expected value of a given shelf space location, but could also be a minimum value for which someone would have to spend to use the shelf space. The minimum value may be set at a value where the system predicts that they can extract more value from that location unless the minimum value is exceeded.

The shelving property map may, in another variation, create a multi-dimensional data model from which a product relevance score can be extracted for a given product or set of products.

Block S130, which includes operating the shelf space management portal interface, functions to use a digital online interface to acquire communication input from interested parties to establish agreed upon or potential shelf space usage options.

Operating the management portal interface enables external parties to use a client computing device to submit a digital shelf space usage request which may then result in a shelf space usage option. As discussed herein, a variety of processes and models may be used in the transformation of requests into options. In some variations, a shelf space usage option may be pre-scheduled, awarded, or otherwise intended for fulfillment. In some variations, this may even include initial or full payment in anticipation of the usage option. However, the method can function to address issues when a usage option is not fulfilled or otherwise does not satisfy conditions of the usage option (e.g., non-compliance to product arrangement, failing to satisfy stock a product within the qualifying usage window, etc.).

The shelf space management portal is preferably an online portal interface such as a website or an application, where interactions with the management portal are facilitated through messaging and communication between a server and a client computing device of the external party. The shelf space management portal is preferably implemented as a digital online marketplace that can be accessed via a graphical user interface or an API. Providing the shelf space management portal can include serving the user interface and/or managing API requests made to the portal.

In particular, the shelf space management portal can be an online shelving marketplace, which facilitates the digital online marketplace where the marketplace operator processes transactions in exchange for fulfillment of shelf space usage.

Operating the shelf space management portal interface is preferably used to take in requests and in response create shelf space usage options that are tracked for fulfillment. Accordingly, operating the shelf space management portal interface S130 can include receiving, through the shelf space management portal interface, a plurality of shelf space usage requests S132 and, in association with at least one request, allocating a shelf space usage option within a shelf space management database system S134.

Herein, "usage request" may alternatively be used as a more concise form of "shelf space usage request". Similarly, herein, "usage option" may alternatively be used as a more concise form of "shelf space usage option".

Block S132, which includes receiving a plurality of shelf space usage requests, functions to acquire inquiries and/or indications of potential desire for use of shelf space. A shelf space usage request can be received from a client computing device. A single client computing device may make a single or multiple requests. In general, multiple different client computing devices are used by different parties for submitting a multitude of requests. A user request may be submitted based on input to one or more user interfaces. In some cases, a portion of a request may be defined through pre-defined configuration such as default settings of the account making the request.

A usage request may include one or more shelf space placement parameters. The shelf space placement parameters may characterize conditions on shelf space location or properties.

The usage request may additionally include one or more product identifiers. In variations where the product does not impact availability, the product for display may specified after submitting the initial request.

The usage request may, in some variations, include performance parameters, which characterize if and how performance parameters are used.

The usage request may ins some variations, additionally include offer or bid parameters, which may be used in certain shelving marketplace variations.

In some method variations, a usage request may be converted and recorded directly as a usage option. In this variation, requests are translated and stored as shelf space usage options.

In other method variations, the shelf space management portal may facilitate some process of review and processing of the request prior to initiating allocation a usage option in block S130. This variation may, in particular, be useful within a shelving marketplace variation where outside entities purchase or bid on shelf usage. The initial request can serve as a query into available or potentially available candidate shelf face usage option stock within the marketplace and/or as a bid for auction or selection process.

In one variation, the usage request is used as a query input where the shelf space placement parameters and other optional parameters such as product information are used in finding corresponding stock of candidate shelf space usage options and presenting the candidate shelf space usage option stock. Accordingly, such a variation may include finding, using the shelving property map, a set of candidate shelf space option and displaying the set of candidate shelf space options in the shelf space management interface (e.g., a graphical user interface of an online marketplace interface). In this variation, allocating the shelf space usage option can include: upon receiving selection of at least one candidate shelf space option through the shelf space management interface, allocating the least one selected candidate shelf space option within the shelf space management database system. There are a variety of modes in which such a user interface may be controlled.

In the context of a marketplace, the operating the shelf space management portal may include serving a presentation of shelf space options. This may include presenting candidate shelf space option (e.g., available stock of options for product display placement) within the user interface. In one variation, this may include presenting a graphical map of shelf space such that candidate shelf space options can be identified and selected based on represented location. This may alternatively include presenting shelf space options by characteristics, which can include presenting options based on different properties of the shelf space.

In a variation, serving a presentation of shelf space options can include receiving a shelf space query request and responding with a set of candidate shelf space usage options. The set of shelf space options can be ranked by relevance to the query.

In some variations, candidate shelf space options are not presented as a set of selectable options. Instead, the marketplace enables a shelf space usage request to be configured and then a result can be served. The result may function as a quote with cost, timing, conditions, and/or other details. If the user wants to move forward, they can commit or move forward with the result. In some instances, multiple result options may be generated, and they can move forward with one, multiple, or none of the result options. In this variation, providing and operating a shelving marketplace can include receiving a shelf space usage request, wherein the request is defined by a set of usage configuration properties and generating a set of shelf space usage option results. The set of shelf space usage options may include no results if the request cannot be satisfied or one or more results if the request may be satisfied.

These various user interfaces or other suitable user interfaces may be applied to various marketplace models. There can be a number of various ways the marketplace may be implemented. Some exemplary variations include a purchase-based marketplace variation, a profile-based marketplace variation, an auction-based marketplace variation, performance-based marketplace variation, and a shelf space abstraction variation. These variations may be used in combination. For example, an auction-based marketplace may also enable performance-based shelf space usage. Other variations may additionally be used. Such marketplace models are described herein.

In association with presenting a user interface of possible product display options, the method or more specifically operating the shelf space management portal interface may include assessing shelf space availability. Assessing shelf space availability can be based on the shelving property map. Assessing shelf space availability may additionally or alternatively be based on operator specified environment configuration which may assign, prohibit, or control offering shelf space usage by location, product, product class, display options, and/or other properties. For example, only a subset of one environment may be configured for offering through the marketplace.

For a specific request, assessing shelf space availability may be performed only for shelf spaces in the one or more environment that would satisfy or be similar to the shelf space parameters specified in the request.

Assessing shelf space availability may additionally include identifying shelf space locations in the one or more environment that satisfy conditions qualifying the shelf space as offering as candidate shelf space usage options. In this way, shelf space may only be offered if it makes sense to offer that particular shelf space. As one example, a shelf location with high value (e.g., products historically have sold well) may qualify. High value products in a shelf location may perform at such a rate that the method may automatically avoid changing the stocking so those shelf locations may not be offered (or alternatively offered at a very high rate). Other conditions may also be considered in selecting candidate shelf space usage options.

In connection with presenting or display candidate shelf usage option, the various options may be presented with one or more metrics such as availability, predicted fulfillment window, expected value, predicted or historical performance metrics, and/or other information. Availability may indicate when and how many qualifying shelf space locations will be available. A predicted fulfillment window may indicate an approximation of when product placement will occur for a given option. Expected value may indicate the price of the option, the expected or historical sales change for that location or other value-based information. Predicted or historical performance metrics may show predicted or historical item views or item pick-ups from the associated locations. These metrics may be indicated as a values relative to other locations. For example, item views or pickups may be rated relative to current product position or the average number of views and pickups across a store. These may be presented as metrics for an individual location or as a grouped metric for locations across a range of environments.

In one exemplary interface, a set of shelf space usage filters can be provided relating to all or many of the subset of placement properties in the shelving property map. In this way, a user may indicate geographic, customer traits, chain, store size, store type, store location, neighboring product, display type (e.g., shelf, endcap, bin, register shelf, entrance display, exit display, etc.), and/or other properties. The various booking options can be updated and displayed as the filters are updated.

Block S134, which includes allocating a shelf space usage option within a shelf space management database system, functions to designate a shelf space usage request for potential fulfillment.

The allocation of the shelf space usage option is preferably performed in association with at least one request. As discussed, in some variations, a request may or may not necessarily be translated into a usage option for fulfillment. In the case of a bid request made for an auction, it will be allocated if it is selected as a winner of the auction but may not be allocated as a usage option if it is not a winner. In other variations, a request may be directly allocated as a shelf space usage option, which functions to add that request to a pool of requests which may or may not be fulfilled.

A shelf space usage option is a data record or set of associated data records that includes or specifies fulfillment parameters including at least one product identity and a set of shelf space placement parameters. As with the usage request, the usage option may additionally specify performance parameters, which may indicate performance metrics for tracking and thresholds for transactions. The usage option may additionally specify a value—the price for fulfillment of the usage option.

Block S140, which includes directing operations of shelf space stocking based on the shelf space usage options, functions to automate fulfillment shelf space usage options to managing inventory logistics. This may include actively taking actions to trigger or prompt fulfillment of a usage option. This may additionally or alternatively include performing sensor-based auditing of fulfillment in the environment to report and perform any related actions (like updating transaction status). Directing operations preferably can include analyzing current inventory stocking, planning stocking updates, and generating stocking instructions.

Analyzing current inventory stocking preferably uses the monitoring system and/or other inventory tracking system input to track an amount of available inventory (on order, in storage, on display, etc.). In the case of a CV monitoring system, real-time inventory data can be used to report or estimate the inventory currently on display and where this may be used in generating a substantially real-time planogram.

In a preferred variation, the current inventory stock is tracked and maintained within the shelving property map.

Planning stocking updates preferably determines how the stocking of products (e.g., how products are displayed) should change. Stocking updates may indicate where to add products, where to move products, how to adjust displays (changing stacking or facing), which products to remove, and/or other aspects of product display.

Planning stocking updates is preferably performed by coordinating fulfillment of at least a subset of shelf space usage options stored in the shelf space management database system with the current inventory stocking. In an ideal case, each shelf space usage option is fulfilled. In some instances, not all shelf space usage options are fulfilled at one given time. There may even be instances where one shelf space usage option is never fulfilled if, for example, some condition for the usage is never available. In one implementation, there is a prioritization process whereby different shelf space locations, usage options, and/or other conditions are evaluated in a prioritized order. Coordinating fulfillment of shelf space usage options may include coordinating fulfillment of shelf space usage options across different retail environments. Stocking updates may be planned periodically. They may be planned daily, weekly, or at any suitable interval. In one variation, the stocking updates are updated in coordination with inventory shipments so that they reflect the current inventory capabilities of the store.

Accordingly, the planning stocking updates may include selecting a first shelf space usage option form the shelf space management database system S142, which functions to identify one usage option that can be fulfilled based on current inventory status and product stocking status.

In a basic case, the first usage option may be selected based on current inventory for stocking. When a shipment of a product arrives, the shelf space management database system can be queried to identify an associated shelf space usage option. If found, then stocking directives may be generated so that the product can be stocked in the appropriate location.

This process may be further augmented by assessing if a qualifying shelf location is available for stocking of the inventory product. Available spaces may not be available because of other shelf stocking obligations or other factors.

In another variation, the selection of a usage option may be performed in response to current stocked inventory. Such a variation can include analyzing the shelving property map and detecting shelf space usage availability. Selecting the first shelf space usage option can be selected based on the usage availability. Additionally, communicating of stocking directives for the first shelf space usage option will additionally be based on usage availability. For example, analyzing the shelving property map, can identify a shelf space location that is available, will soon be available, or is suitable for making available for product placement. Selecting the first shelf space usage option, in such a variation can include querying the shelf space management database system using shelf placement properties of the available shelf space. Querying the shelf space management database may result in a plurality of usage options. These usage options may be prioritized based on various factors for determining the selected shelf space option.

Analyzing the shelving property map and detecting shelf space usage availability may include for at least one shelf location calculating an operational cost of a stocking change. This may be further generalized to calculating value of stocking change which may factor in the operational cost of a worker or robot moving product from that location and moving other product to that location, the performance of the currently stocked product(s) in that location, potential performance of a candidate usage option, the transaction cost received in exchange for the stocking change, and/or other factors. This may function to identify locations where stocking changes would be justified.

The selection of a usage option from the shelf space management database system may involve the metric based fulfillment where a usage option is picked for fulfillment based on one or more metrics differentiating it from other potential usage options.

In one such variation, selecting the first shelf space usage option can include selecting a set of candidate shelf space usage options that have shelf space placement parameters matching a first shelf space region (e.g., potentially one identified through analyzing the shelving property map); and selecting the first shelf space usage option from the set of candidate shelf space usage options based on a metric comparison of the set of candidate shelf space usage options. The first shelf space region may be a shelf space region will be available, soon available, or otherwise where a planned product placement will occur. One or more metric comparison may be used. Example metrics can include relevance of a usage option's product to that location (e.g., is it consistent with other products stocked at or near there), the historical performance of the usage option's product, the fulfillment price, and/or other metrics or a combination of metrics.

Figure 8:
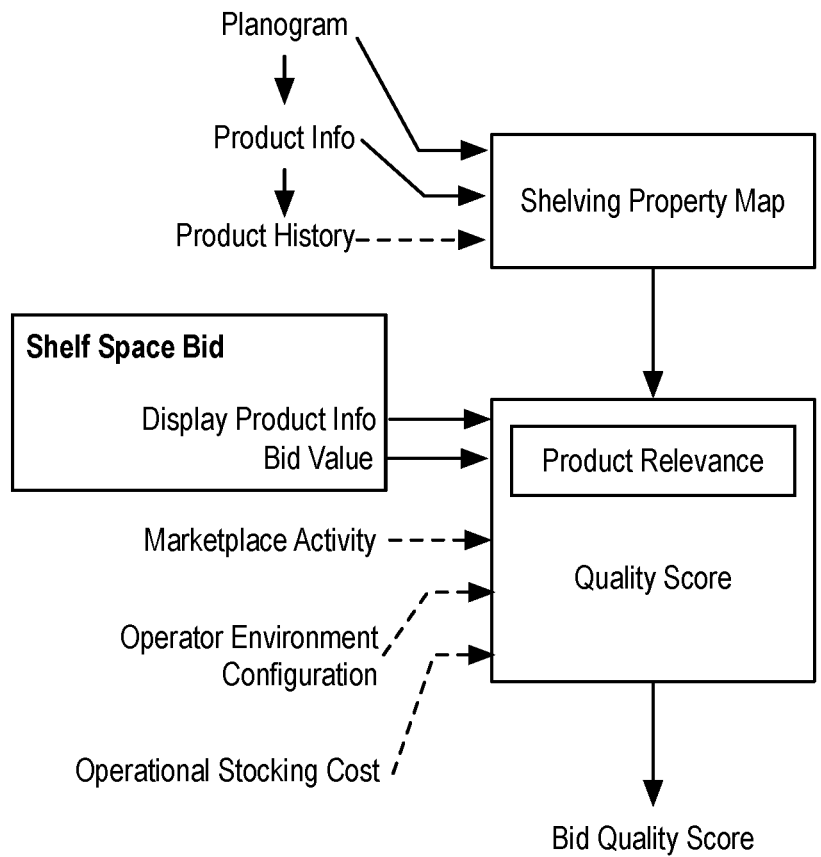
FIG. 8 is a schematic representation of one exemplary process of determining a quality score.

In one such metric-based selection process, selecting the first usage option can include calculating a quality score based on at least a comparison of the product identity of the first shelf space usage option and the first shelf space region; and wherein the metric comparison includes at least a comparison of quality score. The quality score can be an assessment of the general quality of a usage option compared to other usage options. The quality score preferably incorporates a product relevance score, a fulfillment bid value, and product performance data. As shown in FIG. 8, a quality score may depend on various factors including those used in calculating the value of a shelf location. This may be particularly useful in a variation where external parties supply their own bid value for fulfillment. This sets the price that will be willing to pay if it is fulfilled. That may also determine the price for fulfillment if they are selected. However, in some implementations, a price below their bid price may be used depending on the mechanics of the marketplace.

Directing operations may additionally include coordinating product inventory delivery, wherein products may be ordered and shipped to appropriate destinations. In one version, orders may be ordered automatically. In another version, product order reports may be generated, and those may be used by someone to submit an order after reviewing. Automated or semi-automated product ordering can be particularly helpful when implemented across a large number of retail environments and appropriate inventory is needed. Inventory can be particularly ordered so that new products can be stocked to fulfill a shelf space usage option. Inventory ordering may additionally be implemented in response to monitoring of inventory levels of current inventory. In one exemplary instance, a shelf space usage option may have a condition of being stocked above some minimum threshold. Automated ordering of the product can assist in not allowing the product to drop below the minimum threshold.

Block S144, which includes communicating stocking directives for the first shelf space usage option, functions to at least partially automate the process of altering the stocking of a retail environment for the fulfillment of a at least a subset of booked shelf space usage options.

In one variation, the stocking instructions are a report that is produced with information and instructions for fulfillment of the updating the stocking of the retail environment. The report may list a number of items that require stocking updates. These stocking updates may include tasks like adding inventory to a set location, setting or changing to a defined arrangement, tidying of inventory, refilling inventory, removing inventory, moving to another location, and/or other suitable changes. The stocking directives may be used for the fulfillment of a usage option. In many cases, this involves moving stocked inventory or stocking new inventory into qualifying shelf space location. In some cases, this can additionally involve moving stocked inventory out of the shelf space location to allow space for the paid product placement. In other situations, however, stocking directives may involve putting stocked products into compliance of a usage option. For example, a usage option may have a condition that a particular arrangement or tidiness level is a condition for payment. If a product is messy and out of compliance the report can indicate that the product should be tied so that payment for the placement can resume.

In one variation, the report is communicated through a digital communication channel to a device. In one variation, the recipient device may depend on sensed location of the device within the environment. In this way, workers moving around a store performing stocking duties may receive instructions in a location appropriate manner.

In some instances, the stocking instructions are integrated into an electronic stocking system such that the stocking updates are instructed through the stocking system. For example, a stocking system may provide stocking instructions through an electronic device when a particular product barcode ID is scanned. Accordingly, communicating stocking directives may include updating an inventory management system with stocking instructions; and, at the inventory management system, presenting stocking directives in response to electronic reading of the product identifier associated with the product identity of the first shelf space usage option. The stocking instructions may be delivered through other suitable interfaces.

In one variation, where robotic stocking system is available, the robotic stocking system may be at least partially directed by the stocking instructions. For example, inventory may be moved by an automated robotic system to approximate stocking locations. Furthermore, at least a portion of the inventory may further be restocked by the robotic stocking system.

Block S150, which includes verifying fulfillment of the selected shelf space usage option through the sensor data, functions to confirm that a usage option had a product displayed in compliance with the condition of the usage option. In some cases, verifying fulfillment may alternatively or additionally include verifying compliance of fulfillment over a sustained period.

As described, a shelf space usage option will specify one or product identifier and a shelf placement parameter. If a single product identifier, then the associated product should be stocked in a location satisfying the shelf placement parameters. If there are a plurality of product identifiers, then one product, a combination of products, or all products associated with the product identifiers should be stocked in a location satisfying the shelf placement parameters. In some situations, shelf placement parameters may additionally specify arrangement or display conditions such as a particular arrangement (front facing, side facing, stacked, some arbitrary arrangement) or a tidiness score, and stocked inventory level as a few examples. The products should also satisfy any such shelf placement parameters as well.

Verifying fulfillment can use the collected sensor data, and in particular the collected image data to confirm completion and satisfactory fulfillment of a usage option. For example, when a shelf space usage option is booked for a product X to be placed in location J for one week, then that shelf space usage option may be verified as when product X is visually identified in location J over a one week period.

The shelving property map may be inspected or monitored to determine when fulfillment is complete. Accordingly, some variations of block S150 may include confirming, based on processing of updated image data from the computer vision monitoring system, fulfillment of conditions defined through the fulfillment parameters of the first shelf space usage option S152.

Alternatively, the processing of sensor data as part of block S110 may alternatively be used directly. In one example, collected image data is processed for identification of products and location of the products. The products and location of the products may be used to query the shelf space management database to determine if a usage option is being fulfilled. In some situations, a usage option may be expected to be fulfilled because a stocking directive was issued and so an associated usage option can be more directly confirmed as fulfilled. In other cases, such as when performed without operational directives, potential usage options may be dynamically confirmed as being fulfilled.

Confirming fulfillment (or current compliance) may, in response, trigger updating the shelf space management database S154, which functions to perform some resulting action. In general, the action can at least include updating the data records such that the fulfillment of a shelf space usage option is reflected in a shelf space management portal.

In some variations, in particular marketplace implementation variations, verifying fulfillment may additionally or alternatively include updating transaction status associated with the usage option. Depending on a marketplace implementation, updating status may include various actions.

In one variation, updating a transaction status can include initiating a transaction associated with the usage option. This serves to initiate collection of payment from a payment account associated with the party associated with the usage option.

In another variation, updating transaction status may include updating metered billing of an account. This may involve where fulfillment of a shelf space usage option adds to an invoice for an account. A periodic transaction may be initiated for all accumulated costs.

In another variation, updating transaction status can include finalizing a previous transaction or otherwise marking a previous transaction/order as complete. In this variation, an account may prepay for fulfillment of a usage option. When fulfilled, updating of a data record may indicate that the transaction is complete. If a usage option is not fulfilled within a designated time window, then a reversal or return may be initiated.

In alternative variations, updating transaction status associated with a usage option may be performed in response to detecting or verifying performance. For example, an account may be billed for occurrences of some event like views or purchases.

Variations that involve performing a transaction (e.g., in anticipation of fulfillment, during ongoing fulfillment, or after completion) will generally depend on a fulfillment value or price being associated with the usage option. The price can be set in different ways depending method implementation. The price (or value) may be used within the processing of a request and/or selecting a usage option for fulfillment.

In one simple implementation, price can be set as a predefined fee. There may be a small number of different fees depending on certain properties. For example, stocking on a mid-shelf may have one price, and stocking on an endcap of an aisle another price.

In another implementation, price may be set based on some measured attribute of fulfillment of the usage options. Examples of measurable attributes which may have corresponding price per amount of the attribute can include number of products stocked, size (e.g., length) of the shelf space region, number or measure of a performance metric such as number of views, pickups, add to carts, or purchases.

In other variations, the price may be set or specified within the request. For example, in an auction-based marketplace, requests may supply price bids. Requests selected for fulfillment will have a price based on the bid price of the request.

In other variations, a value may be calculated for each location, such locations may have different prices. Usage options and/or accounts associated with the usage options may have settings to set maximum price or expenditure to prevent situations where a product is placed in location with too high a price. Many variations may make use of calculating a location-associated value. A location associated value could be for a particular location or for a set of locations that match a set of shelf placement parameters.

One location-associated value variation may involve calculating a value of a location-associated value for a candidate shelf space usage option presented in a user interface. This functions to set a dynamic price that will be used as price for a resulting usage option if the user confirms that option. In this way, the method may include: finding, using the shelving property map, a set of candidate shelf space option, calculating location-associated value of each candidate shelf space option stock and displaying the set of candidate shelf space options with the location-associated values in the shelf space management interface. In this variation, allocating the shelf space usage option can include: upon receiving selection of at least one candidate shelf space option through the shelf space management interface, allocating the least one candidate shelf space option within the shelf space management database system, where the resulting shelf space usage option is associated with the location-associated value. If fulfilled, the location associated value may be used as the transaction value (or in calculating the transaction value).

Another location-associated value variation may involve calculating a location-associated value and using the value in running an auction. The value may be used to set the minimum bid threshold.

Another location-associated value variation may involve calculating a location-associated value, and selecting a usage option from the shelf space management database system for fulfillment based in part on value. In this way the value of location may alter the criteria for selecting a usage option over another.

In other variations, a value may be calculated based on a specific request or usage option. This variation may include analyzing the shelf space placement parameters, product information, relationship of the product to the available locations, bid price, and the like may be used in generating a price. Requests for locations in higher demand and lower availability will generally be assigned a higher price while requests for locations in lower demand.

Figure 7:
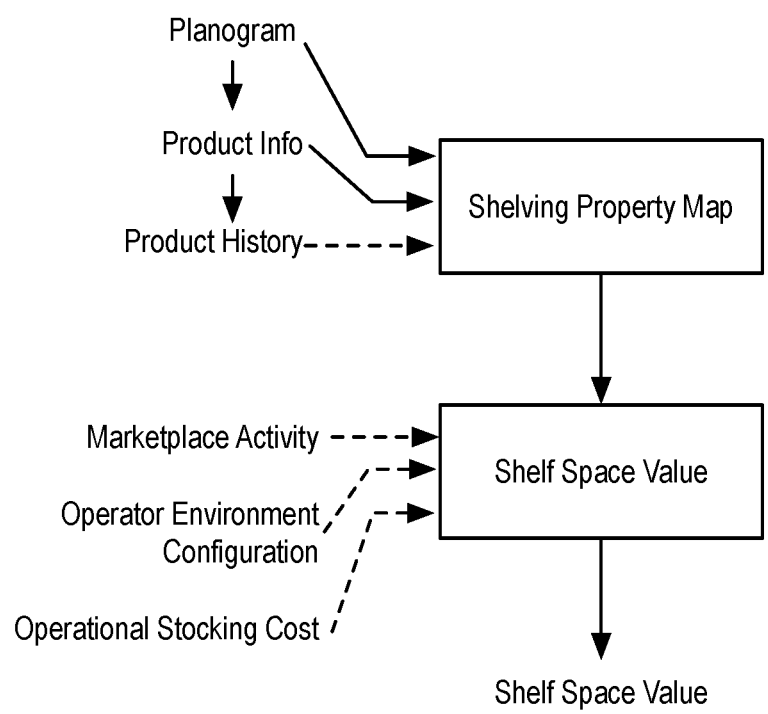
FIG. 7 is a schematic representation of one exemplary process of determining a shelf space value.

As shown in FIG. 7, a value for a usage request, a usage option, and/or a shelf placement parameter (including a specific location or set of locations) may be based on various factors. The value may depend directly or indirectly on the planogram, product information, product history, marketplace activity, operative environment configuration, operational stocking cost, and/or other factors. In some cases, information may be extracted from the shelving property map. Accordingly, the method may include calculating a value for a request, a usage option, a locations corresponding to shelf placement parameter(s), and/or a combination of a usage request or usage option with a location corresponding to a shelf placement parameter(s). In general, a value may be calculated partially based on data from the shelving property map. However, calculating the value may additionally or alternatively be based on, depending on the situation: the shelf placement parameters, data from the shelf space management portal, transaction data associated with products historically stocked at locations corresponding to the location placement parameters, environment configuration, operational stocking cost, and/or product relevance of product to a location placement parameters. This may make use of the shelving property map and/or other data sources such as a transaction data source.

These factors may be combined or used in a variety of ways. In one such implementation, the value may be based on the impact of a location to sales results. Accordingly, a variation may include collecting transaction sales data; finding, using the shelving property map, a set of products stocked at locations with related shelf space placement parameters; calculating a change in transaction sales data for the set of products when stocked at a location with the shelf space parameters compared to a different location; and calculating a value for the set of shelf space placement parameters. This value may generally be used in setting a price for a candidate shelf space usage option within a marketplace interface.

Figure 10:
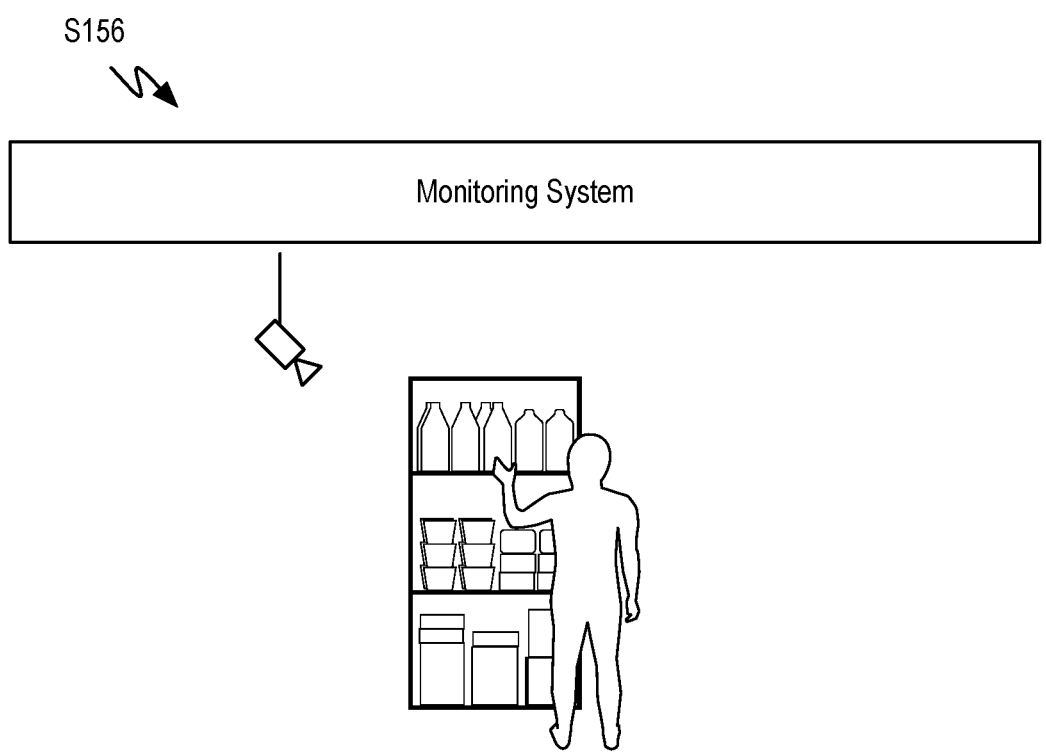
FIG. 10 is a schematic representation of method variation including monitoring performance.

As shown in FIG. 10, the method may additionally include monitoring performance S156, which functions to track events detected during the placement of a product. Monitoring performance can more specifically include monitoring performance of the product when stocked at shelf space location corresponding to the shelf space placement parameters. Performance parameters as specified in the usage request and/or the usage option may define which performance metrics are tracked and how. Alternatively, performance parameters may be monitored by default depending on the configuration of the method.

Monitoring of performance is preferably performed using the monitoring system and more specifically through collecting of image data. Processing of image data as described in block S110 may be applied or used in monitoring performance in order to perform the operations: detecting user views of a product, counting customers that pass a product, counting number of product pickups, and the like. In the case when used with CV monitoring system also used for automated checkout or that otherwise manages a virtual checkout list, monitoring performance may include detecting product purchase.

In one example, a method variation, where a shelf space usage option that has been fulfilled may specify performance parameters, may include detecting, by processing of image data, user-item interaction events. In response to detecting the user-item interaction event, the method may include updating performance metric data records associated with the shelf space usage option, which functions to track the performance metrics. In response to detecting the user-item interaction event, the method may additionally or alternatively include initiating a transaction in response to the performance metric data records. Often, the performance may be tracked over a time window and the transaction is performed based on the tracked performance during the time window.

Some variations of monitoring performance may alternatively make use of monitoring performance through other forms of collected data such as transaction data. For example, monitoring performance may include collecting transaction data, detecting purchases of the product, and relating the purchases of the product in the performance metric data records associated with the corresponding shelf space usage option.

In one example, a method variation, where a shelf space usage option that has been fulfilled may specify purchase performance parameters, may include collecting transaction data, detecting, by processing of the transaction data, occurrences of product purchase events within the transaction data while the product was stocked in a shelf space location corresponding to the shelf space placement parameters of the usage option. In response to detecting the product purchase event, the method may include updating purchase performance metric data records associated with the shelf space usage option, which functions to track the purchase performance metrics. In response to detecting the product purchase event, the method may additionally or alternatively include initiating a transaction in response to the purchase performance metric data records. Often, the performance may be tracked over a time window and the transaction is performed based on the tracked performance during the time window.

Performance may be tracked by raw counts or measures of different events. Additionally or alternatively, performance may be measured and used as a change of performance from a previous shelf space location. In this way, performance reporting and/or tracking may be performed based on percent change from previous performance. This may function to reflect the impact on the new product placement.

In some variations, monitoring performance S156 functions to verify performance, as in the case where the occurrence of one or more event is used as a condition for fulfillment.

Verifying performance may include verifying product placement, product arrangement (how it's stacked, arranged, faced, etc.), duration of placement, shelf inventory thresholds (e.g., keeping stocked above X amount), and number of events like purchases or attention events.

In some instances, verifying performance is used in completing or finalizing a booking order for shelf space. Some bids, purchases, or orders may be conditional on various results or implementation details. When conditions can be verified the order of the booking can be completed which may include the execution of a financial transaction in an amount calculated on various factors.

Figure 9:
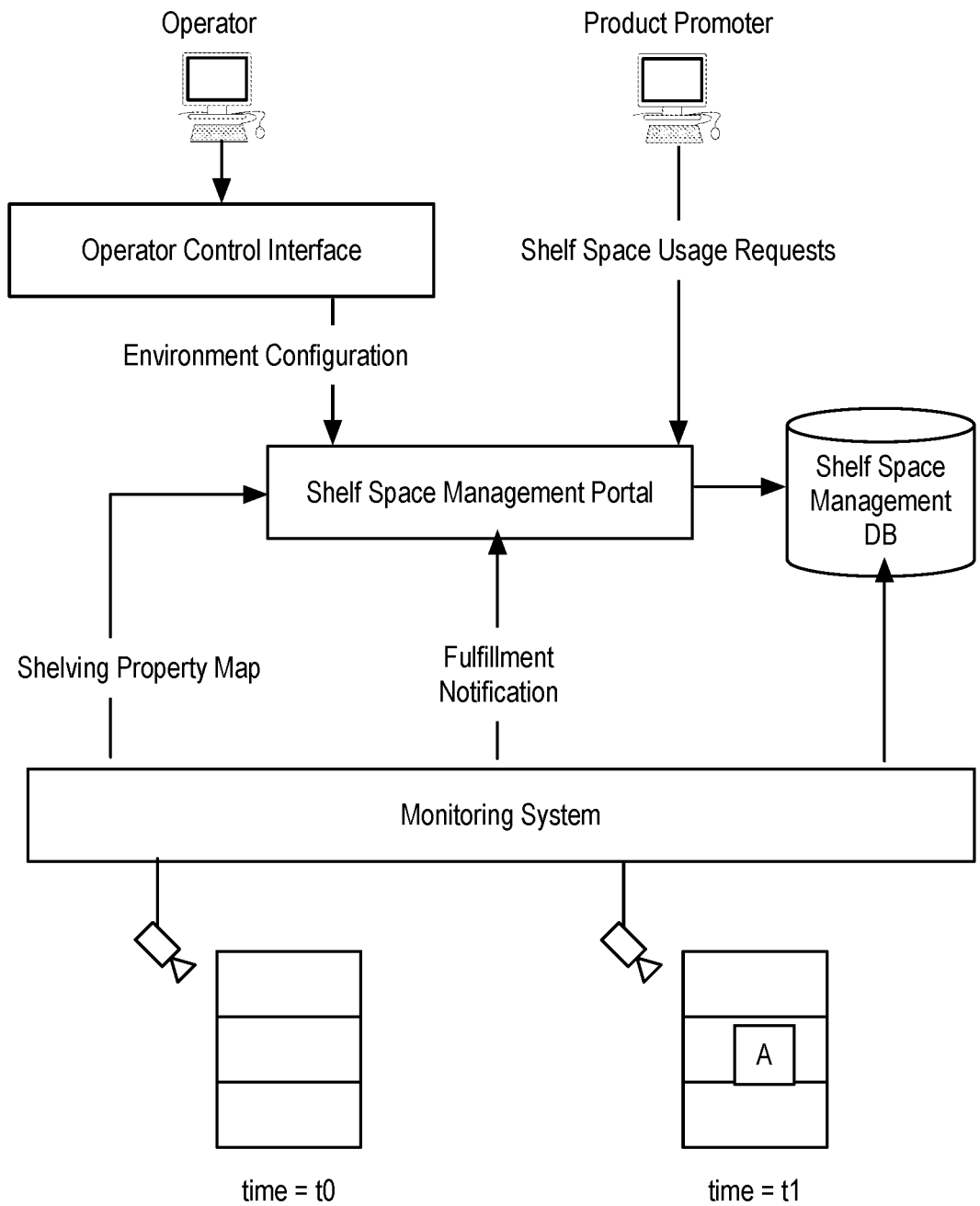
FIG. 9 is a schematic representation of an exemplary method implementation using an environment configuration.

As shown in FIG. 9, some method variations may include receiving an environment configuration record through an operator control interface and enforcing policy specified in the environment configuration record, which functions to establish environment configuration for one or more environments. This environment configuration can provide operators of an environment a mechanism through which some control over how product placement is executed. The environment configuration may function as policy configuration that is enforced on various steps of the method operation. The operator control interface may be a user interface available to operator accounts so that one or more environments can be managed. Various reports on the status of fulfillment of usage options and/or potential unfulfilled usage options may also be reviewable within the operator control interface.

Enforcing policy of the environment configuration record may be performed when allocating a shelf space usage option. Various settings specified may alter how a usage request is serviced and/or converted into a usage option. For example, various rules may be set for which shelf space locations are available or restricted for particular types of products.

Enforcing policy of the environment configuration record may be performed when selecting a shelf space usage option for fulfillment. For example, rules or settings may be used in the selection process.

As discussed, operating the shelf space management portal interface S130 may involve applying one or more of different approaches or models for operation of the portal interface and allocation of shelf space usage options. Additionally, one system implementing the method may additionally provide flexibility so that different models and approaches are used for different environments (e.g., stores), subregions of shelf space (e.g., using an auction in the wine section, using fixed pricing in the bread aisle, and using quality-based bid selection for the cereal aisle), and/or product classifications/types.

These various user interfaces or other suitable user interfaces may be applied to various marketplace models. There can be a number of various ways the marketplace may be implemented. Some exemplary variations include a purchase-based marketplace variation, a profile-based marketplace variation, an auction-based marketplace variation, performance-based marketplace variation, and a shelf space abstraction variation. These variations may be used in combination. For example, an auction-based marketplace may also enable performance-based shelf space usage. Other variations may additionally be used.

In a purchase-based marketplace variation, users bid or buy shelf space for a specified product. Usage requests are submitted as bids to the shelf space management portal interface. The operating system can confirm when that product is stocked for the selected shelf space. A price may be algorithmically set based on properties of the particular shelf space. This variation can provide a very specific control over where and with which store a product distributer wants their products shelved. For a given query for types of shelf space, a set of candidate shelf placement options (i.e., candidate usage options) may be displayed in a user interface. Selecting an option may book the spot for some amount of time. In one variation, the direct purchase model can be used so that substantially all listed shelf space of a store and possible a set of stores can be selected and booked individually. In another variation, that incorporates a form of shelf space abstraction, shelf space may be booked by generic placement in certain sections of a store environment. For example, certain types of aisles may be booked in a generic manner. Shelf space availability may be generalized as rough position of a shelf along a normalized length of the aisle. This aisle abstracted model may allow individuals to more efficiently book shelf space by booking shelf space across many stores based on a generic characterization of an appropriate aisle. There may be particular windows of time in which a shelf space option can be booked.

In a profile-based marketplace variation, users may be bid for shelf space using set properties. These properties may be submitted as a shelf space request as described above. This variation allows users to not individually pick specific locations but to use various other conditions to define where and whom products are allocated to shelf space. One exemplary shelf space request may specify it being adjacent to at least one of a set of competing products. Another exemplary shelf space may request that 10 units of the product (or some designated length of shelf space) be front-faced along a central shelf in in the middle third of an aisle. Profile-based variations may be used in combination with an auction-based marketplace.

In an auction-based marketplace variation, users bid for shelf space for a particular use. The use is generally characterized by a stocking of a specific product. Various bidding models may be used. In a price-based auction, users may bid on the shelf space until one of the users is determined to be the winner. In a usage-biased auction, a number of factors may be considered in addition to bid price, namely some assessment of the usage of the shelf space. A bid in a usage-biased auction preferably includes a price and an identified product. Particular details may also be supplied about the product and/or conditions of the usage (duration, performance conditions/targets, etc.). Once, the bids are collected, they are preferably ranked based on a combined assessment of bid price and usage assessment. More specifically, this can be ranking by a score generated from the score and product relevance to the shelf space. Each product from each bid is preferably assessed as to its relevance to a particular shelf space. Assessing relevance may assign a score based on relevance to the aisle and nearby products, performance of the product (at similar locations, that location, or other locations). Relevance may function as a predictive on how well that product will perform. The price, cost, and margins for a product may additionally factor into this relevance. In this variation, the highest bid may not always be the selected bid that is granted the shelf space usage option. The product assessment and incorporation into the auction functions to maintain the shopping experience. For example, the usage-biased auction variation may prevent a highly irrelevant product from being stocked in the middle of one category of products. However, if someone is willing to submit an adequately high bid then they may still win the shelf space option though overall the auction can minimize such occurrences and promote a more preferred stocking pattern.

In a performance-based marketplace variation, users may pay for shelf space, submit fees, and/or participate in profit sharing based on performance of a product. This pricing related variation functions to enable users to pay based on results from shelving practices. A performance-based marketplace variation can be setup so that when your product does well for a given shelf placement, you pay based on performance. This variation may be used for a subset of shelf space locations such as the premium shelf space options. In some variations, performance-based marketplace may additionally be combined with other fees.

In a shelf space abstraction variation, users bid for shelf space using generalized representations of shelf space. An abstracted representation of shelf space is preferably used so that general properties of shelf space, which may be based on physical shelf space descriptions (e.g., middle shelf, top shelf, end-cap), relative or qualitative descriptions (health food section, premium product section, bargain section), customer focused descriptions (e.g., men-focused section of store), and the like. These descriptions will preferably translate to actual one or more shelf space locations in one or more retail environments.

Various pricing models may be used in defining how an account may pay for shelf space usage. Some exemplary models are provided below, but any suitable pricing model may be used in any of the variations. Pricing models may be based on, for example, the grant of a shelf space usage option (prior to any stocking event), the carrying out of the stocking of a product, meeting performance thresholds, the quantity of various metrics, purchases made of a product, and completion of a shelf space usage option. Fees, credit, and/or other exchanges of value may be set and implemented in a wide variety of ways in carrying out the shelving marketplace.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums (e.g., non-transitory computer-readable medium) storing instructions that, when executed by the one or more computer processors, cause a computing platform to perform operations comprising those of the system or method described herein such as: collecting sensor data from at least one environment and generating a shelving property map, operating a shelf space management portal interface enabling external parties to use a client computing device to submit a digital shelf space usage request which may then result in a shelf space usage option; and directing operations of shelf space stocking based on the shelf space usage options.

Figure 11:
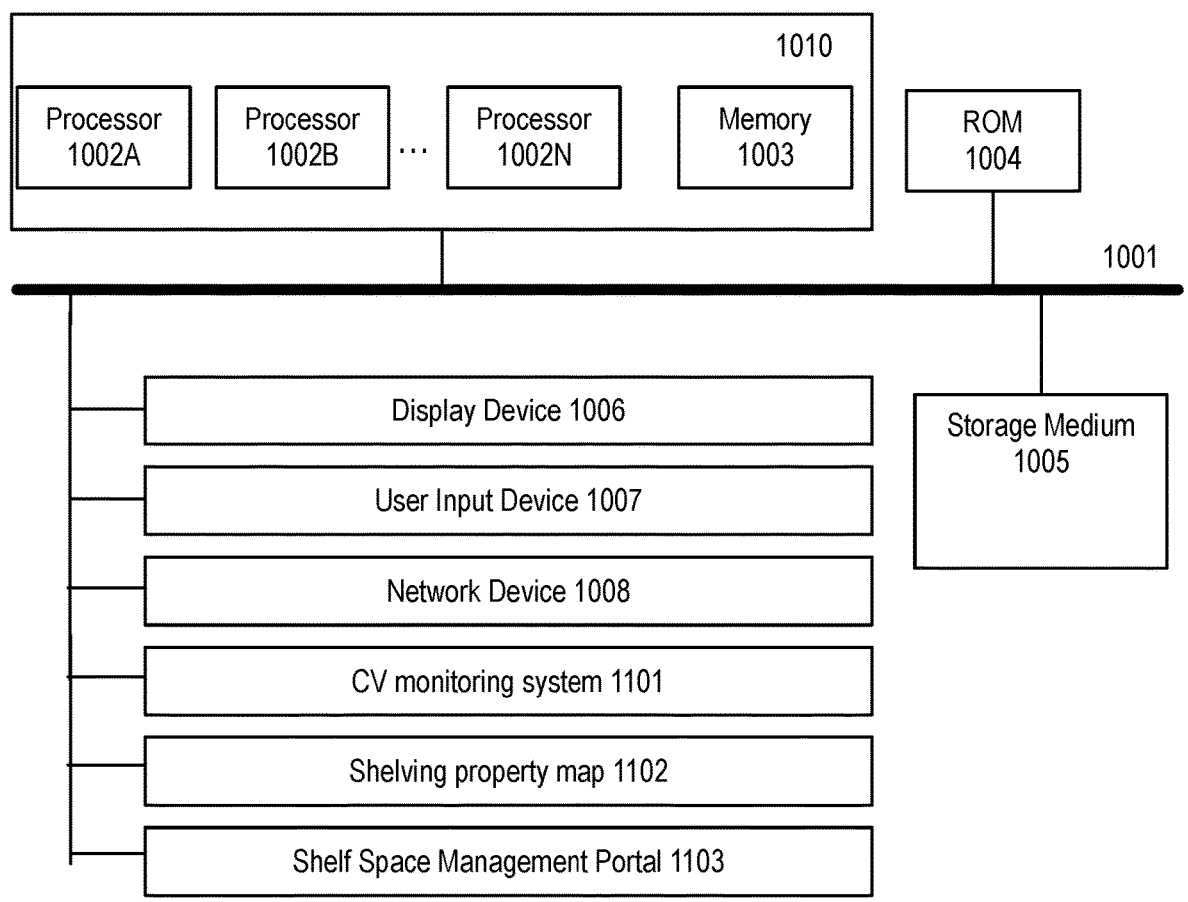
FIG. 11 is an exemplary system architecture that may be used in implementing the system and/or method.

FIG. 11 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting CV monitoring system 1101, shelving property map 1102, online shelf space marketplace 1103, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010.

In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method for inventory stocking management comprising:
    operating a computer vision monitoring system with a distributed set of imaging devices directed at shelf space regions in at least one environment, wherein operating the computer vision monitoring system comprises:
        collecting image data, and
        identifying, by processing the image data, products and shelf space locations of the products;
    maintaining a shelving property map based on the products and shelf space locations identified through the computer vision monitoring system;
    operating a shelf space management portal interface of a shelf space digital marketplace with accounts of a plurality of external parties;
    receiving, through the shelf space management portal interface, a plurality of shelf space usage requests from a plurality of accounts of different external parties, wherein the usage requests indicate at least one shelf space placement parameter, at least one product identifier, and at least one bid parameter;
    based on querying and processing of the plurality of usage requests and the shelving property map, allocating a plurality of shelf spaced usage options within a shelf space management database system based on an auction process, which comprises allocating at least a first shelf space usage option for a first account of an external party, wherein each shelf space usage option specifies fulfillment parameters including at least one product identity and a set of shelf space placement parameters;
    selecting the first shelf space usage option from the shelf space management database system;
    communicating stocking directives for the first shelf space usage option;
    processing of updated image data from the computer vision monitoring system and detecting, by one or more processors, a product with a product identifier matching a product identity fulfillment parameter of the first shelf space usage option and detecting fulfillment of conditions based on the set of shelf space placement parameters of the first shelf space usage option and, in response, initiating a transaction with the first account based in part on the bid parameter of a usage request associated with the first shelf space usage option.

2. The method of claim 1, further comprising analyzing the shelving property map and detecting usage availability; wherein selecting the first shelf space usage option is selected based on the usage availability.

3. The method of claim 1, wherein selecting the first shelf space usage option comprises:
    selecting a set of candidate shelf space usage options that have shelf space placement parameters matching a first shelf space region; and
    selecting the first shelf space usage option from the set of candidate shelf space usage options based on a metric comparison of the set of candidate shelf space usage options.

4. The method of claim 3, wherein selecting the first usage option further comprises calculating a quality score based on at least a comparison of the product identity of the first shelf space usage option and the first shelf space region; and wherein the metric comparison includes at least a comparison of quality score.

5. The method of claim 1, wherein the first shelf space usage option includes performance parameters defining conditions of fulfillment based in part on a defined user interaction event; and detecting, by processing of image data, user item interaction events fulfilling the conditions of fulfillment and updating performance metric data records associated with the shelf space usage option.

6. The method of claim 5, wherein initiating the transaction with the first account is further in response to the performance metrics.

7. The method of claim 1, further comprising finding, using the shelving property map, a set of candidate shelf space options and displaying the set of candidate shelf space options in a shelf space management interface; and wherein allocating the first shelf space usage option comprises: upon receiving selection of at least one shelf space option stock through the shelf space management interface, allocating the at least one shelf space option stock within the shelf space management database system.

8. The method of claim 1, further comprising finding, using the shelving property map, a set of candidate shelf space options, calculating location-associated value of each candidate shelf space option and displaying the set of candidate shelf space options with the location-associated values in the shelf space management interface; wherein allocating the first shelf space usage option comprises: upon receiving selection of at least one candidate shelf space option through the shelf space management interface, allocating the at least one candidate shelf space option within the shelf space management database system, where a resulting shelf space usage option is associated with the location-associated value.

9. The method of claim 1, further comprising receiving environment configuration record through an operator control interface; and enforcing policy specified in the environment configuration record during at least one of: allocating a shelf space usage option and selecting of the first shelf space usage option.

10. The method of claim 1, wherein communicating stocking directives comprises updating an inventory management system with stocking instructions; wherein at the inventory management system, presenting stocking directives in response to electronic reading of the product identifier associated with the product identity of the first shelf space usage option.

11. The method of claim 1, wherein fulfillment parameters comprises at least on a first fulfillment condition based on at least one of: time, sales, and impressions; and wherein detecting fulfillment of conditions based on the set of shelf space placement parameters of the first shelf space usage option is further based on detecting fulfillment the first fulfillment condition.

12. A non-transitory computer-readable medium storing instructions that, when executed by one or more computer processors of a communication platform, cause the communication platform to perform the operations:
operating a computer vision monitoring system with a distributed set of imaging devices directed at shelf space regions in at least one environment, wherein operating the computer vision monitoring system comprises:
collecting image data, and
identifying, by processing the image data, products and shelf space locations of the products;
maintaining a shelving property map based on the products and shelf space locations identified through the computer vision monitoring system;
operating a shelf space management portal interface of a shelf space digital marketplace with accounts of a plurality of external parties;
receiving, through the shelf space management portal interface, a plurality of shelf space usage requests from a plurality of accounts of different external parties, wherein the usage requests indicate at least one shelf space placement parameter, at least one product identifier, and at least one bid parameter;
based on querying and processing of the plurality of usage requests and the shelving property map, allocating a plurality of shelf spaced usage options within a shelf space management database system based on an auction process, which comprises allocating at least a first shelf space usage option for a first account of an external party, wherein each shelf space usage option specifies fulfillment parameters including at least one product identity and a set of shelf space placement parameters;
selecting the first shelf space usage option from the shelf space management database system;
communicating stocking directives for the first shelf space usage option;
processing of updated image data from the computer vision monitoring system and detecting, by one or more processors, a product with a product identifier matching a product identity fulfillment parameter of the first shelf space usage option and detecting fulfillment of conditions based on the set of shelf space placement parameters of the first shelf space usage option and, in response, initiating a transaction with the first account based in part on the bid parameter of a usage request associated with the first shelf space usage option.

13. The non-transitory computer-readable medium of claim 12, wherein selecting the first shelf space usage option comprises:
selecting a set of candidate shelf space usage options that have shelf space placement parameters matching a first shelf space region; and
selecting the first shelf space usage option from the set of candidate shelf space usage options based on a metric comparison of the set of candidate shelf space usage options.

14. The non-transitory computer-readable medium of claim 13, wherein selecting the first usage option further comprises calculating a quality score based on at least a comparison of the product identity of the first shelf space usage option and the first shelf space region; and wherein the metric comparison includes at least a comparison of quality score.

15. The non-transitory computer-readable medium of claim 12, further comprising finding, using the shelving property map, a set of candidate shelf space options and displaying the set of candidate shelf space options in a shelf space management interface; and wherein allocating the first shelf space usage option comprises: upon receiving selection of at least one shelf space option stock through the shelf space management interface, allocating the at least one shelf space option stock within the shelf space management database system.

16. The non-transitory computer-readable medium of claim 12, wherein communicating stocking directives comprises updating an inventory management system with stocking instructions; wherein at the inventory management system, presenting stocking directives in response to electronic reading of the product identifier associated with the product identity of the first shelf space usage option.

17. A system comprising of:
one or more computer-readable mediums storing instructions that, when executed by the one or more computer processors, cause a computing platform to perform operations comprising:

operating a computer vision monitoring system with a distributed set of imaging devices directed at shelf space regions in at least one environment, wherein operating the computer vision monitoring system comprises:
  collecting image data, and
  identifying, by processing the image data, products and shelf space locations of the products;
maintaining a shelving property map based on the products and shelf space locations identified through the computer vision monitoring system;
operating a shelf space management portal interface of a shelf space digital marketplace with accounts of a plurality of external parties;
receiving, through the shelf space management portal interface, a plurality of shelf space usage requests from a plurality of accounts of different external parties, wherein the usage requests indicate at least one shelf space placement parameter, at least one product identifier, and at least one bid parameter;
based on querying and processing of the plurality of usage requests and the shelving property map, allocating a plurality of shelf spaced usage options within a shelf space management database system based on an auction process, which comprises allocating at least a first shelf space usage option for a first account of an external party, wherein each shelf space usage option specifies fulfillment parameters including at least one product identity and a set of shelf space placement parameters;
selecting the first shelf space usage option from the shelf space management database system;
communicating stocking directives for the first shelf space usage option;
processing of updated image data from the computer vision monitoring system and detecting, by one or more processors, a product with a product identifier matching a product identity fulfillment parameter of the first shelf space usage option and detecting fulfillment of conditions based on the set of shelf space placement parameters of the first shelf space usage option and, in response, initiating a transaction with the first account based in part on the bid parameter of a usage request associated with the first shelf space usage option.

18. The system of claim 17, wherein selecting the first shelf space usage option comprises:
  selecting a set of candidate shelf space usage options that have shelf space placement parameters matching a first shelf space region; and
  selecting the first shelf space usage option from the set of candidate shelf space usage options based on a metric comparison of the set of candidate shelf space usage options.

19. The system of claim 18, wherein selecting the first usage option further comprises calculating a quality score based on at least a comparison of the product identity of the first shelf space usage option and the first shelf space region; and wherein the metric comparison includes at least a comparison of quality score.

20. The system of claim 17, further comprising finding, using the shelving property map, a set of candidate shelf space options and displaying the set of candidate shelf space options in a shelf space management interface; and wherein allocating the first shelf space usage option comprises: upon receiving selection of at least one shelf space option stock through the shelf space management interface, allocating the at least one shelf space option stock within the shelf space management database system.

21. The system of claim 17, wherein communicating stocking directives comprises updating an inventory management system with stocking instructions; wherein at the inventory management system, presenting stocking directives in response to electronic reading of the product identifier associated with the product identity of the first shelf space usage option.

* * * * *